(12) United States Patent
Spain

(10) Patent No.: US 11,859,549 B2
(45) Date of Patent: Jan. 2, 2024

(54) THERMODYNAMIC APPARATUS

(71) Applicant: BAE SYSTEMS plc, London (GB)

(72) Inventor: James William Spain, Barrow (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 17/907,420

(22) PCT Filed: Mar. 16, 2021

(86) PCT No.: PCT/GB2021/050656
§ 371 (c)(1),
(2) Date: Sep. 27, 2022

(87) PCT Pub. No.: WO2021/191588
PCT Pub. Date: Sep. 30, 2021

(65) Prior Publication Data
US 2023/0122100 A1    Apr. 20, 2023

(30) Foreign Application Priority Data

Mar. 27, 2020  (EP) .................................... 20275068
Mar. 27, 2020  (GB) .................................... 2004470

(51) Int. Cl.
*F02C 7/10*     (2006.01)
*F02C 1/10*     (2006.01)
*F25B 30/02*    (2006.01)

(52) U.S. Cl.
CPC .................. *F02C 7/10* (2013.01); *F02C 1/10* (2013.01); *F25B 30/02* (2013.01)

(58) Field of Classification Search
CPC ...... F02C 1/06; F02C 1/08; F02C 1/10; F02C 1/105; F02C 7/08; F02C 7/10;
(Continued)

(56) References Cited

U.S. PATENT DOCUMENTS

| | | | | |
|---|---|---|---|---|
| 2,516,910 A | * | 8/1950 | Redding | .................. F02C 7/08 60/39.511 |
| 2,631,430 A | * | 3/1953 | Staley | ...................... F02C 7/08 60/39.511 |

(Continued)

FOREIGN PATENT DOCUMENTS

| | | |
|---|---|---|
| WO | 2009146000 A1 | 12/2009 |
| WO | 2018005886 A1 | 1/2018 |
| WO | 2021191588 A1 | 9/2021 |

OTHER PUBLICATIONS

International Preliminary Report on Patentability received for PCT Application no. PCT/GB2021/050656, dated Sep. 22, 2022. 7 pages.
(Continued)

*Primary Examiner* — Alain Chau
(74) *Attorney, Agent, or Firm* — Finch & Maloney PLLC

(57) ABSTRACT

A thermodynamic apparatus (10) comprising a compressor module (100), a turbine module (200), and a regenerative heat exchanger (300) centred on a central axis (12). The compressor module (100), turbine module (200) and regenerative heat exchanger (300) are arranged in series along the central axis (12) such that the regenerative heat exchanger (300) is provided between the compressor module (100) and the turbine module (200).

20 Claims, 21 Drawing Sheets

(58) Field of Classification Search
CPC .... F02C 6/003; F25B 30/02; F05D 2260/211; F05D 2260/213
See application file for complete search history.

(56) References Cited

U.S. PATENT DOCUMENTS

| | | | | |
|---|---|---|---|---|
| 2,870,608 | A * | 1/1959 | Comyns-Carr | F02C 1/105 376/318 |
| 3,224,199 | A * | 12/1965 | Best | F42B 19/20 60/497 |
| 3,355,883 | A * | 12/1967 | Beam, Jr. | F02C 7/14 416/198 A |
| 3,949,557 | A | 4/1976 | Eskeli | |
| 3,956,899 | A * | 5/1976 | Kronogard | F02C 1/105 60/682 |
| 4,993,223 | A * | 2/1991 | Kretzinger | F02C 7/08 165/166 |
| 5,131,231 | A * | 7/1992 | Trimble | F02C 1/10 60/668 |
| 8,397,506 | B1 | 3/2013 | Wright et al. | |
| 10,731,664 | B2 * | 8/2020 | Lurisci | F04D 29/441 |
| 2001/0052231 | A1 * | 12/2001 | Ryan | F28D 9/0018 29/890.03 |
| 2010/0037623 | A1 * | 2/2010 | Jewess | F02C 7/08 60/770 |
| 2010/0176592 | A1 * | 7/2010 | Artes De Arcos Marco | F02C 6/18 415/177 |
| 2014/0102098 | A1 | 4/2014 | Bowan et al. | |
| 2015/0023778 | A1 * | 1/2015 | Berg | F02C 3/05 415/116 |
| 2016/0305324 | A1 * | 10/2016 | Magowan | F02C 7/185 |
| 2016/0348539 | A1 | 12/2016 | Peter et al. | |
| 2017/0292450 | A1 * | 10/2017 | Kutnjak | F02C 3/34 |
| 2017/0306979 | A1 * | 10/2017 | Iurisci | F04D 29/441 |
| 2017/0356340 | A1 * | 12/2017 | Vaisman | F02C 1/10 |
| 2019/0093556 | A1 | 3/2019 | Wagner et al. | |
| 2019/0186361 | A1 * | 6/2019 | Gerstler | F02C 7/08 |

OTHER PUBLICATIONS

International Search Report and Written Opinion received for PCT Application No. PCT/GB2021/050656, dated Jun. 18, 2021. 13 pages.
GB Search Report under Section 17(5) received for GB Application No. 2004470.7, dated Sep. 7, 2020. 3 pages.
Extended European Search Report received for EP Application No. 20275068.3, dated Oct. 26, 2020. 7 pages.

* cited by examiner

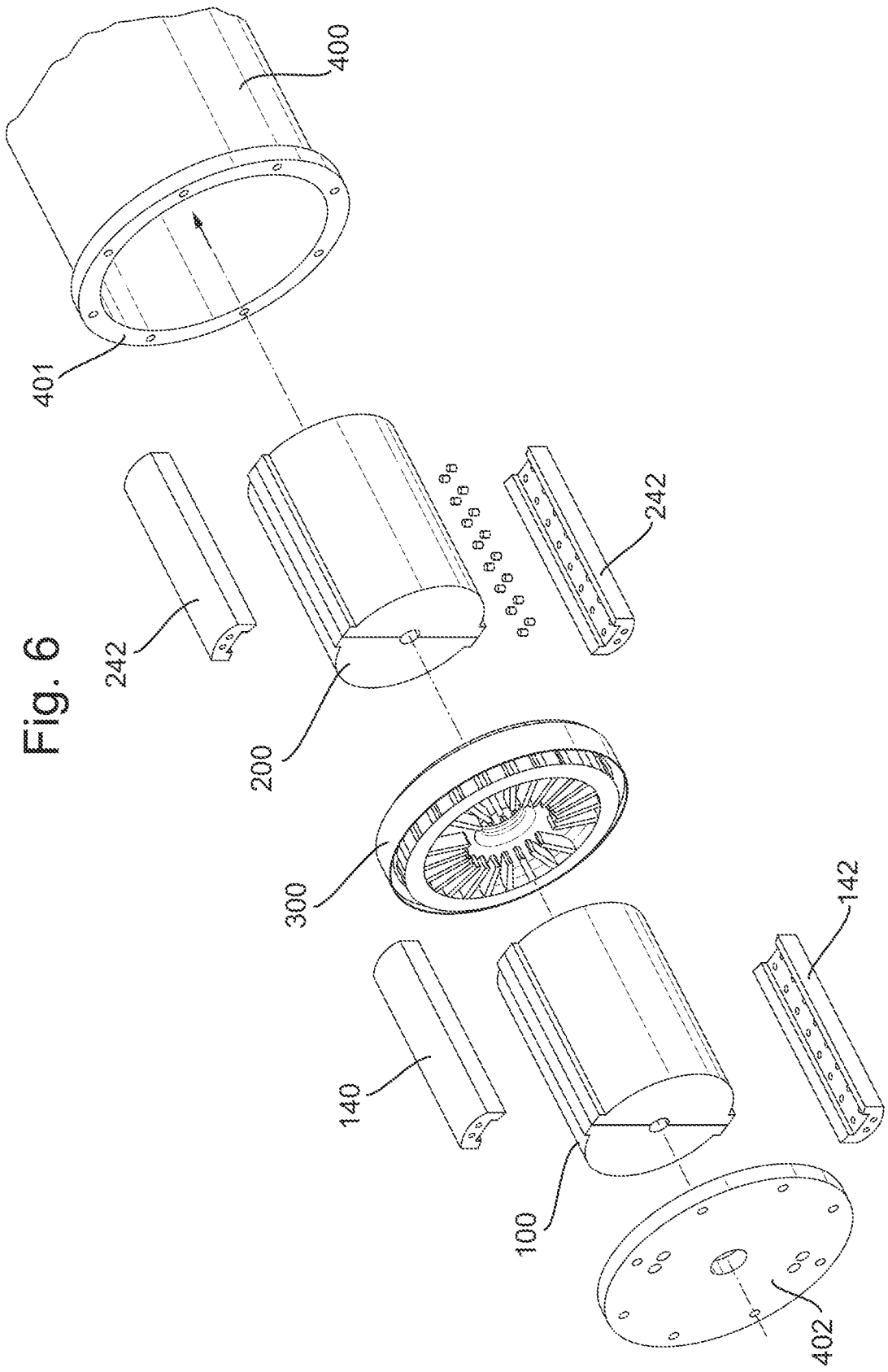

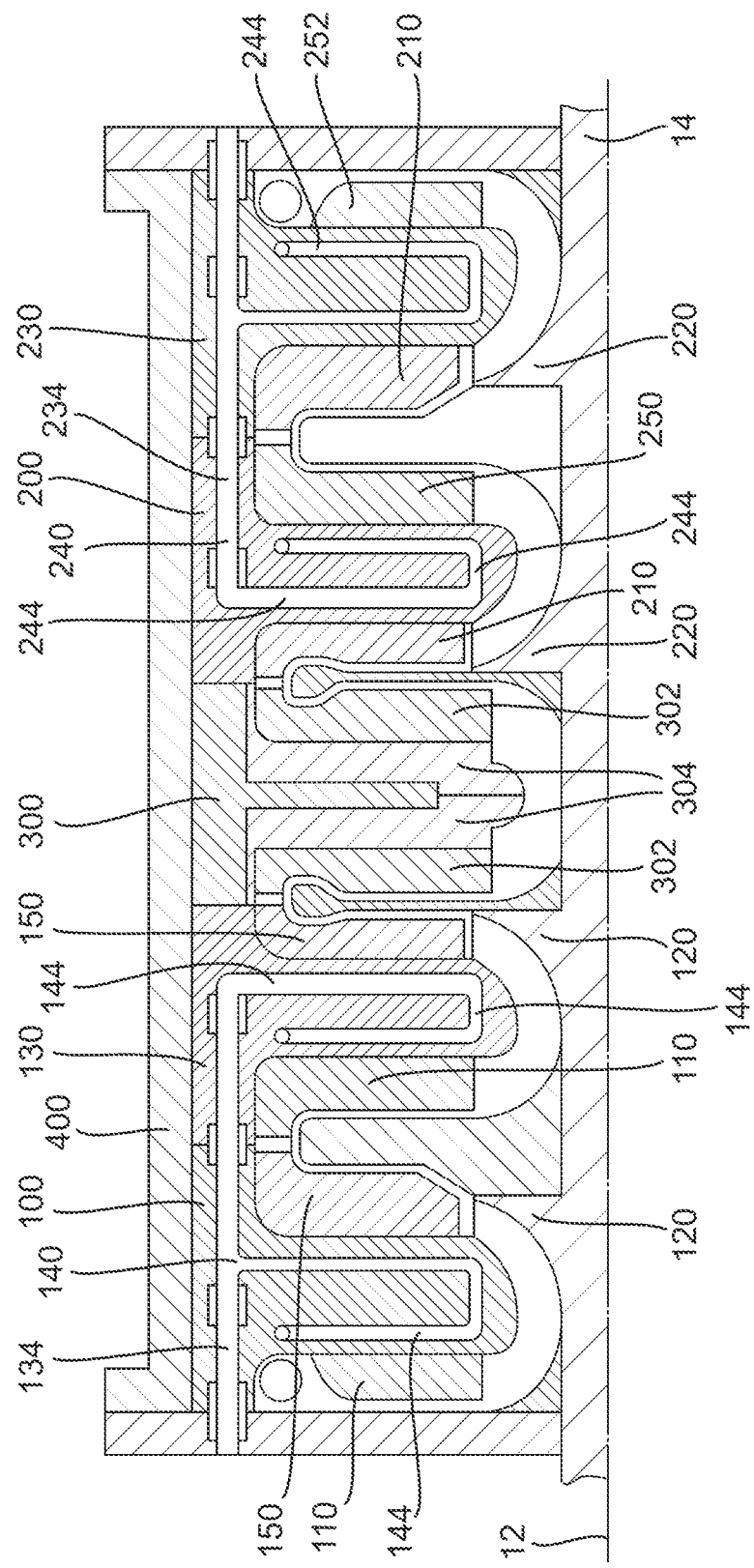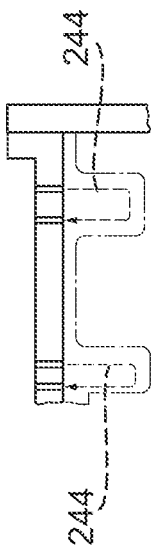

THERMODYNAMIC APPARATUS

The present disclosure relates to a thermodynamic apparatus.

In particular the disclosure is concerned with a thermodynamic apparatus provided as a heat engine or heat pump.

BACKGROUND

A heat engine is a system that converts heat energy to mechanical energy, which can then be used to do mechanical work. It does this by changing a working fluid from a higher state temperature to a lower state temperature. The working fluid generates work in the working body of the engine while transferring heat to a heat sink. During this process some of the thermal energy is converted into work.

A heat pump is transfers heat energy from a source of heat to a thermal reservoir. Thermal energy is absorbed from a cold space and delivered to a warmer one. To achieve this work must be done on the working fluid of the device—for example, a motor may be used to drive the heat exchange to transfer energy from the heat source to the heat sink.

Although not appropriate to all applications, heating or cooling may be achieved between compressor/turbine rotor stages of a heat engine or heat pump by mixing working gas flows, although this is limited by the availability of working fluid available downstream of the compressor and/or turbine. Alternatively heat transfer may be achieved by passing working fluid through a heat exchanger external to the turbine and/or compressor, which adds to size and complexity of the apparatus. All of these methods are aimed to add additional heat to expanded working fluid downstream of a turbine rotor stage, or remove heat from compressed working fluid downstream of the compressor rotor stage.

However, all the systems have the demerit of being limited to the availability of working fluid passing through the apparatus, or require bulky apparatus (for example external heat exchangers external to the turbine and/or compressor) which take up an undesirable amount of space and inherently introduce losses to the system by virtue of inevitable heat transfer to/from the environment surrounding the apparatus. These are significant considerations for applications such as use in power generation or power storage systems, especially where they are provided on vehicles including, but not limited to, vessels (e.g. boats or ships).

Hence a system which increases the thermal efficiency of a heat engine, but allows it to be of a compact size compared to examples of the related art, is highly desirable.

SUMMARY

According to the present disclosure there is provided a thermodynamic apparatus as set forth in the appended claims. Other features of the invention will be apparent from the dependent claims, and the description which follows.

Accordingly there may be provided a thermodynamic apparatus (10) comprising a compressor module (100), a turbine module (200), and a regenerative heat exchanger (300) centred on a central axis (12). The compressor module (100), turbine module (200), and regenerative heat exchanger (300) may be arranged in series along the central axis (12) such that the regenerative heat exchanger (300) is provided between the compressor module (100) and the turbine module (200).

The thermodynamic apparatus (10) may further comprise a shaft (14) centred on, and rotatable about, the central axis (12). The shaft (14) may extend through the compressor module (100), the turbine module (200), and regenerative heat exchanger (300). The compressor module (100) may comprise a rotor (120). The turbine module (200) may comprise a rotor (220). Both rotors (120, 220) may be carried on and rotatable with the shaft (14).

The thermodynamic apparatus (10) may further comprises a casing (400), wherein the casing (400) extends around the compressor module (100), turbine module (200), and a regenerative heat exchanger (300).

The compressor module (100), a turbine module (200), and a regenerative heat exchanger (300) define a working fluid flow duct (20) which extends, in series, through: a compressor module inlet (102) to a compressor module outlet (122); a first path (302) through the regenerative heat exchanger (300); a turbine module inlet (202) to the turbine module outlet (222); a first intermediate duct (22); a second path (304) through the regenerative heat exchanger (300), which is in heat transfer communication with the first path (302); and a second intermediate duct (24) to the compressor module inlet (102).

The compressor module (100) may defines a first portion (26) of the working fluid flow duct (20) which extends between the compressor module inlet (102) and the compressor module outlet (122). The compressor module (100) may comprise: a first heat exchanger (110) and the compressor rotor (120), each provided in the working fluid flow duct (20). The first heat exchanger (110) may be provided in flow series between the compressor module inlet (102) and the compressor rotor (120). The compressor rotor (120) may be provided in flow series between the first heat exchanger (110) and the compressor module outlet (122). There may also be provided a heat transfer unit (130) which defines the first portion (26) of the working fluid flow duct (20). The first heat exchanger (110) may be in heat transfer communication with the heat transfer unit (130) via a first main passage (134) for a first heat transfer medium. The first heat exchanger (110) may be configured such that it is operable to transfer heat to the heat transfer unit (130) from the working fluid passing the first heat exchanger (110).

The turbine module (200) may define a second portion (28) of the working fluid flow duct (20) which extends between a turbine module inlet (202) and a turbine module outlet (222) configured to expand a working fluid as the working fluid passes along the working fluid flow duct (20). The turbine module may comprise: a first heat exchanger (210) and a turbine rotor (220), each provided in the working fluid flow duct (20); the first heat exchanger (210) provided in flow series between the turbine module inlet (202) and the turbine rotor (220). The turbine rotor (220) may be provided in flow series between the first heat exchanger (210) and the turbine module outlet (222). There may also be provided a heat transfer unit (230) which defines a portion (232) of the working fluid flow duct (20) in flow series between the turbine rotor (220) and turbine module outlet (222). The first heat exchanger (210) may be in heat transfer communication with the heat transfer unit (230) via a second main passage (234) for a second heat transfer medium, and the first heat exchanger (210) is configured such that it is operable to transfer heat received from the heat transfer unit (230) to the working fluid passing the first heat exchanger (210).

The first main passage (134) and second main passage (234) may each comprise an inlet plenum (140, 240) and an outlet plenum (142, 242), and the inlet plenum (140) and outlet plenum (142) of the compressor (100) may be in fluid flow communication via a compressor first sub-passage (144) defined by the compressor heat transfer unit (130) for the transfer of the respective heat transfer medium through the compressor first heat exchanger (110). The inlet plenum (240) and outlet plenum (242) of the turbine (100) are in fluid flow communication via a turbine first sub-passage (244) defined by the turbine heat transfer unit (230) for the transfer of the respective heat transfer medium through the turbine first heat exchanger (210). Each inlet plenum (140, 240) may have an inlet (146, 246) for communication with a different source of heat transfer medium. Each outlet plenum (142, 242) may have an outlet (148, 248) to exhaust the respective heat transfer medium.

The first sub-passage (144, 244) may extend through the first heat exchanger (110, 210). The first heat exchanger (110, 210) may be in flow series between a first inlet (160, 260) to the first sub-passage (144, 244) and a first outlet (162, 262) from the first sub-passage (144, 244). The the first inlet (160, 260) may be configured to receive heat transfer medium from the inlet plenum (140, 240); the first outlet (162) being configured to exhaust into the outlet plenum (142, 242).

A second heat exchanger (150) may be located in the working fluid flow duct (20) in flow series between the compressor rotor (120) and the compressor module outlet (122) in the heat transfer unit (130). The second heat exchanger (150) may be configured such that it is operable to transfer heat to the heat transfer unit (130) from the working fluid passing the second heat exchanger (150).

A second heat exchanger (250) may be located in the working fluid flow duct (20) in flow series between the turbine rotor stage (220) and the turbine module outlet (222) in the heat transfer unit (230). The second heat exchanger (250) may be configured such that it is operable to transfer heat received from the heat transfer unit (230) to the working fluid passing the second heat exchanger (250).

The first sub-passage (144, 244) may extend through the second heat exchanger (150, 250).

A second sub-passage (170, 270) may extend through the second heat exchanger (150, 250); and the second heat exchanger (150, 250) is in flow series between a second inlet (172, 272) to the second sub-passage (170, 270) and a second outlet (174, 274) from the second sub-passage (170, 270). The second inlet (172, 272) may be configured to receive heat transfer medium from the inlet plenum (140, 240). The second outlet (174, 274) may be configured to exhaust into the outlet plenum (142, 242).

The first heat exchanger (110, 210) may be provided in series along the first sub-passage (144, 244) between the first inlet (160) and the second heat exchanger (150, 250), and the second heat exchanger (150, 250) may be provided in flow series between the first heat exchanger (110, 210) and the first outlet (162, 262) from the first heating medium flow sub-passage (144, 244).

The first sub-passage (144, 244) may comprise a first node (180) between the first inlet (160, 260) and the first heat exchanger (110, 210) where the sub-passage diverges to form a first branch (184) and second branch (186). There may also be provided a second node (190) between the outlet (162, 262) and the second heat exchanger (150, 250) where the first branch (184) and second branch (186) join. The first branch (184) of the first sub-passage (144,244) may extend through the first heat exchanger (110, 210) and bypasses the second heat exchanger (150, 250). The second branch (186) may bypass the first heat exchanger (110, 210) and extend though the second heat exchanger (150, 250).

The first sub-passage (144, 244) may comprise a third sub-passage (188, 288) which extends from a second inlet (189, 289) in fluid communication with the inlet plenum (140, 240) through the second heat exchanger (150, 250).

The third sub-passage may join the first sub-passage (144, 244) between the outlet of the first heat exchanger (110, 210) and first sub-passage outlet (144, 244); such that flow through the first inlet (160, 260) and second inlet (189, 289) exit through the first outlet (162, 262).

Hence there may be provided a heat engine of increased thermal efficiency and power output which has lower running costs compared to examples of the related art. There may also be provided a heat pump of increased thermal efficiency, with lower power requirements and hence lower running costs compared to examples of the related art. Hence a heat engine or heat pump according to the present disclosure may be smaller and cheaper than examples of the related art having similar capacity, giving a significant competitive advantage.

BRIEF DESCRIPTION OF THE DRAWINGS

Examples of the present disclosure will now be described with reference to the accompanying drawings, in which:

FIG. 6 shows an exploded view of the thermodynamic apparatus shown in FIG. 4;

FIG. 7 shows a first sectional view of the thermodynamic apparatus shown in FIG. 4;

FIG. 7A shows an alternative sub-passage arrangement;

DETAILED DESCRIPTION

The present disclosure relates to a closed loop heat engine or heat pump system comprising a compressor system and/or a turbine system of the present disclosure. In operation a working fluid is passed through the compressor and turbine. At the same time, a compressor heat transfer medium (for example a coolant for removal of heat from the working fluid in the compressor) is passed through the body of the compressor module, and a turbine heat transfer medium (for example a heating medium for addition of heat to the working fluid in the turbine) is passed through the body of the turbine module.

A thermodynamic apparatus comprising the turbine system and compressor system of the present disclosure may be used in power generation applications using regenerative, reheated, intercooled closed cycle turbo machinery. A turbine module of the present disclosure may be operable to approximate isothermal expansion. A compressor of the present disclosure may approximate isothermal compression. Hence the turbine module and compressor module may be included into a heat engine based on a closed cycle gas turbine arrangement for producing power from a heat source. This arrangement of equipment may provide a heat engine which operates in a manner approximating the Ericsson thermodynamic cycle. Hence the thermodynamic apparatus may be provided a closed cycle gas turbine that may be driven by a heated fluid source and a cooled fluid source to rotate a shaft, and hence provide a power output.

A thermodynamic apparatus comprising the turbine system and compressor system of the present disclosure may be used in refrigeration applications (i.e. to operate as a heat pump). Hence the thermodynamic apparatus may be provided a closed cycle gas turbine that may be driven by a motor to provide a power input, and hence move heat from a heat source to a heat sink.

The apparatus of the present disclosure may also include equipment operable to control, start and stop and seal the machinery. The present disclosure may also relate to a method of manufacture and assembly of a compressor, turbine and regenerative heat exchanger according to the present disclosure.

Figure 1:
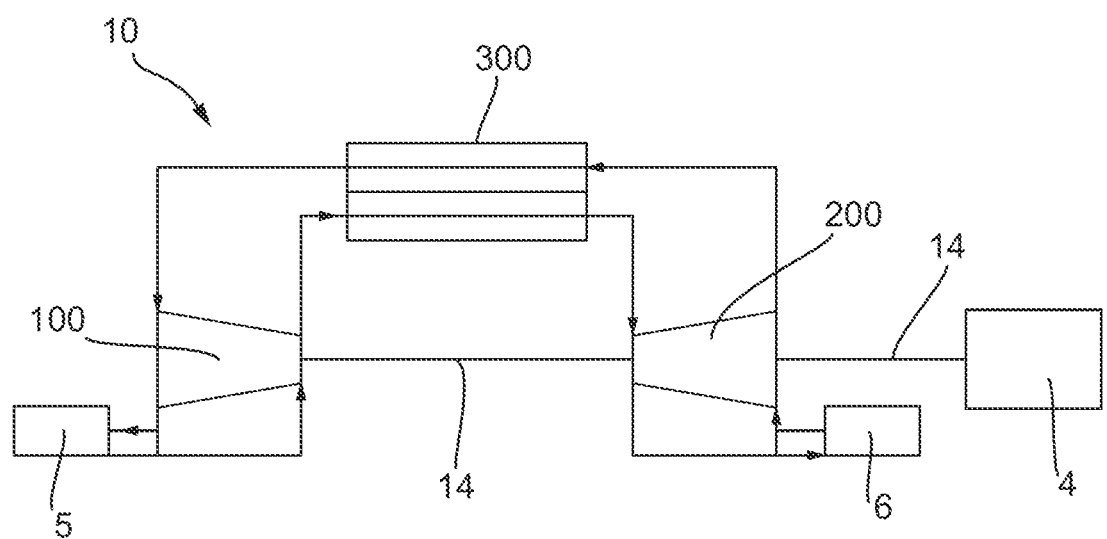
FIG. 1 is a schematic representation of a thermodynamic apparatus according to the present invention.

FIG. 1 shows a schematic representation of a thermodynamic apparatus 10 (which may be configured as a heat engine or heat pump) including a cooled compressor 100, a heated turbine 200, a fluid heater 6 (configured to be in heat flow communication with a heat source), a fluid cooler 5 (configured to be in heat flow communication with a heat sink) and a recuperator (heat exchanger) 300 to create the thermodynamic apparatus 10.

As a heat engine, this can be used to drive a generator 4, or alternatively a propulsion shaft and propeller, a compressor, pumps or other power consuming equipment. It can also power combinations of these items. As a heat pump, power is input into the shaft. Both may comprise turbine inter-stage heating and a nozzle heater, and a compressor with cooled diaphragm blading and inter-stage cooling according to the present disclosure herein described. It provides a heat engine or heat pump with extremely high thermodynamic efficiency, and a simple design which can be manufactured using the components as described.

Heat sources can include but are not limited to: burning fuel, reactors, thermal solar and/or geothermal.

In FIG. 1 the heater fluid supply and return, and cooler fluid supply and return pipework, is shown as a single line for illustration purposes only. Each of these pipes can pass through a manifold, and split into the many supply and return lines to provide fluid at the same temperature to each heating or cooling element.

Figure 8:
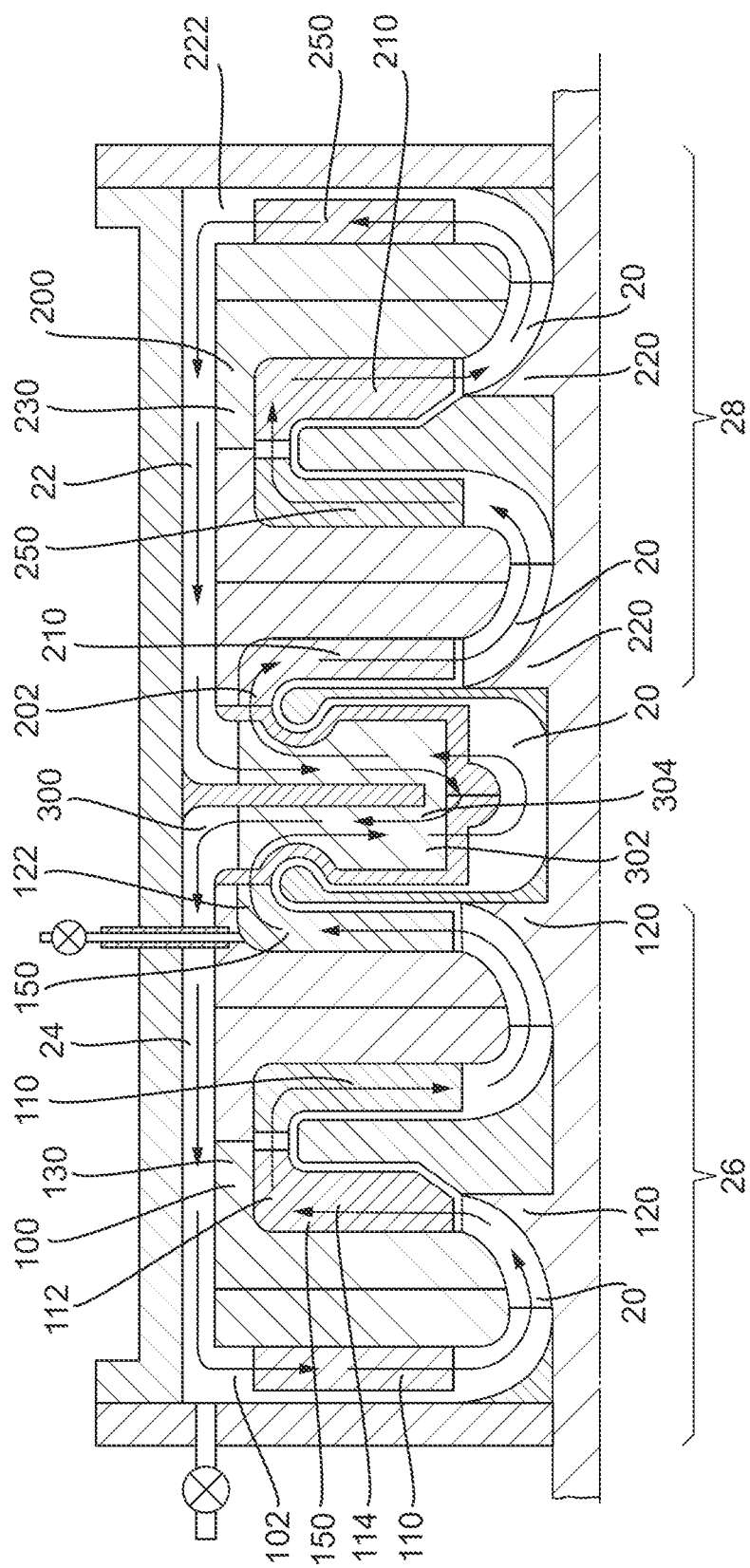
FIG. 8 shows a second sectional view of the thermodynamic apparatus shown in FIG. 4.
Figure 9:
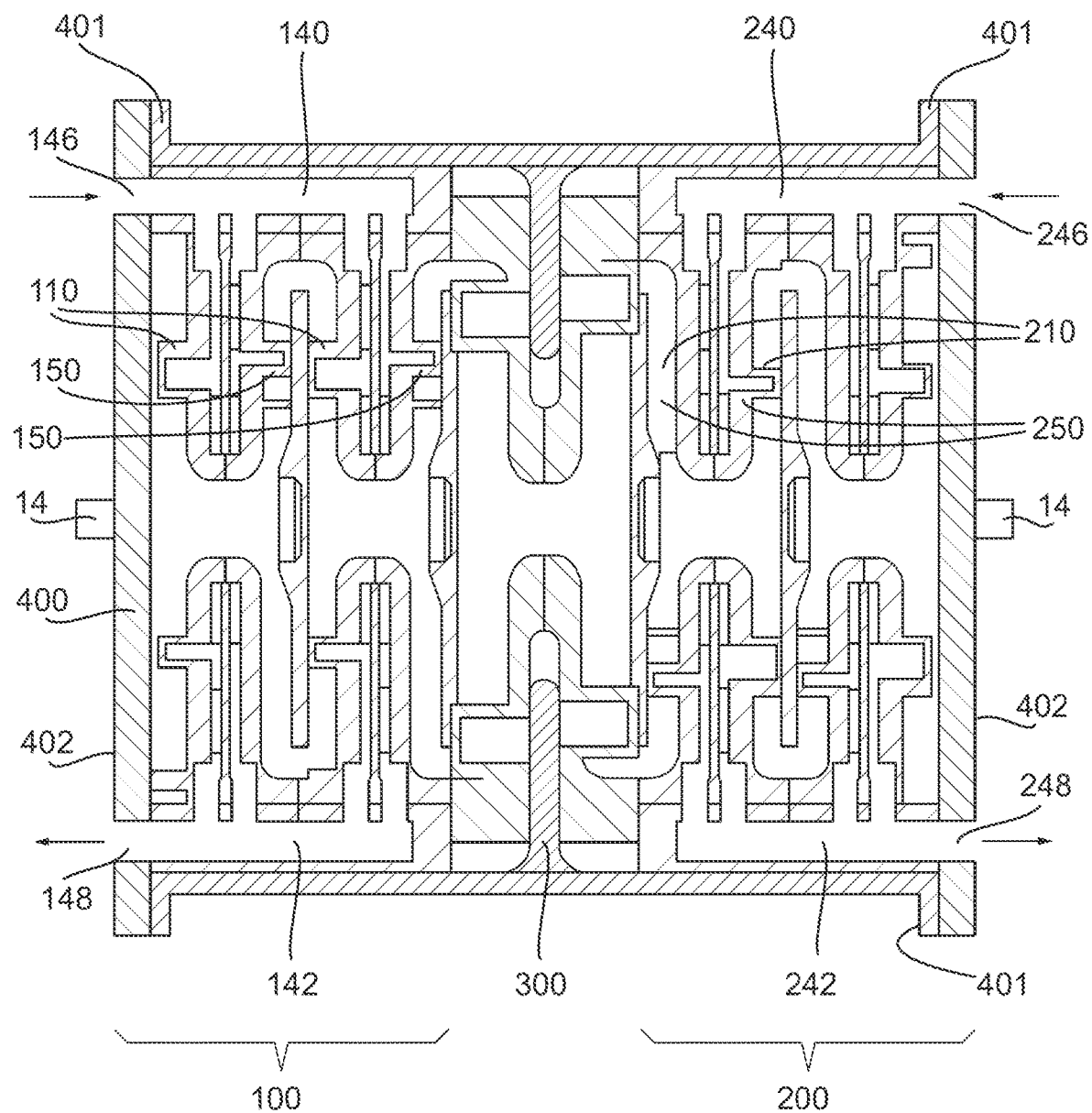
FIG. 9 shows a sectional view of an alternative example of a thermodynamic apparatus according to the present disclosure.

As presented in FIGS. 2, 3, 5 to 10, a thermodynamic apparatus 10 according to the present disclosure comprises a compressor module 100, a turbine module 200, and a regenerative heat exchanger 300 centred on a central axis 12. The compressor module 100, a turbine module 200, and a regenerative heat exchanger 300 are arranged in series along the central axis 12 such that the regenerative heat exchanger 300 is provided between the compressor module 100 and the turbine module 200. As shown in FIGS. 7, 8, the regenerative heat exchanger 300 defines two flow paths 302, 304. The first flow path 302 is operable to deliver working fluid from the compressor module 100 to the turbine module 200, and the second flow path 304 is operable to deliver working fluid from the turbine module 200 to the compressor module 100. The paths 302, 304 are in heat transfer communication with one another. That is to say, the first flow path 302 and second flow path 304 are configured so that heat energy may be transferred between them. For example, the flow paths 302, 304 may be adjacent one another, divided by a wall with an appropriate heat transfer characteristic.

The regenerative heat exchanger 300 may be configured to be counter flow. That is to say, the first flow path 302 and second flow path 304 may be arranged such that working fluid flows in a first direction along the first flow path 302 from the compressor module 100 to the turbine module 200, and in a second direction along the second flow path 304 from the turbine module 200 to the compressor module 100. Hence the first direction may be opposite to the second direction, such that a counter flow is provided.

In an example in which the thermodynamic apparatus is a heat engine the regenerative heat exchanger 300 is operable (i.e. configured to) transfer heat energy from the second path 304 to the first path 302, and thereby transfer energy from the working fluid in the second path 304 (i.e. working fluid being delivered from the turbine module 200 to the compressor module 100) to the working fluid in the first path 302 (i.e. working fluid being delivered from the compressor module 100 to the turbine module 200). In an example in which the thermodynamic apparatus is a heat pump, the regenerative heat exchanger 300 is operable (i.e. configured to) transfer heat energy from the first path 302 to the second path 304, and thereby transfer energy from the working fluid in the first path 302 (i.e. working fluid being delivered from the compressor module 100 to the turbine module 200) to the working fluid in the second path 304 (i.e. working fluid being delivered from the turbine module 200 to the compressor module 100).

Figure 32:
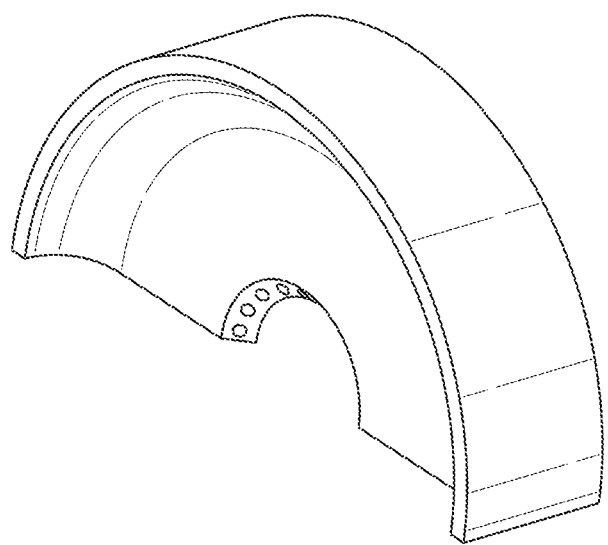
FIGS. 32, 33 shows an example component of the regenerative heat exchanger.
Figure 33:
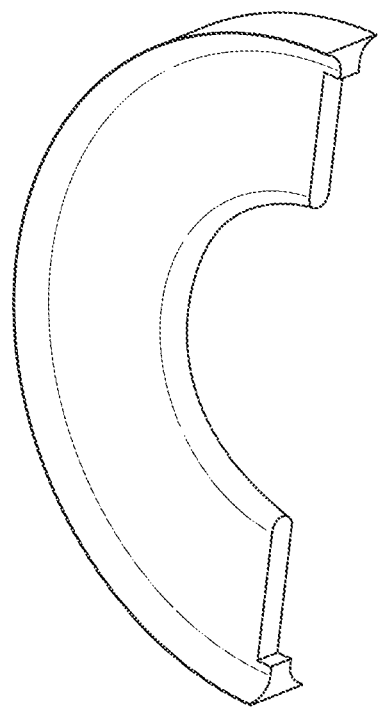

The regenerative heat exchanger 300 may have a design of simple construction using a low number of simple parts (minimum of three, shown assembled in FIG. 17) which can be manufactured using common manufacturing techniques (machining, forging, casting, additive manufacture) ensuring low cost. The design also allows for a high surface area (increasing heat exchange and efficiency), low flow friction losses and for the channels in each side of the working fluid to be optimised in shape and size to achieve an efficient heat transfer with minimal flow losses. The main components include two heat exchanger plates (FIGS. 26 to 31) and a flow guide (FIGS. 32, 33).

The apparatus further comprises a shaft 14 centred on, and rotatable about, the central axis 12. The shaft 14 extends through the compressor module 100, the turbine module 200, and regenerative heat exchanger 300. The compressor module 100 comprises at least one rotor 120 (i.e. compressor rotor stage). The turbine module 200 comprises at least one rotor 220 (i.e. turbine rotor stage). Both rotors 120, 220 are carried on and rotatable with the shaft 14.

Figure 4:
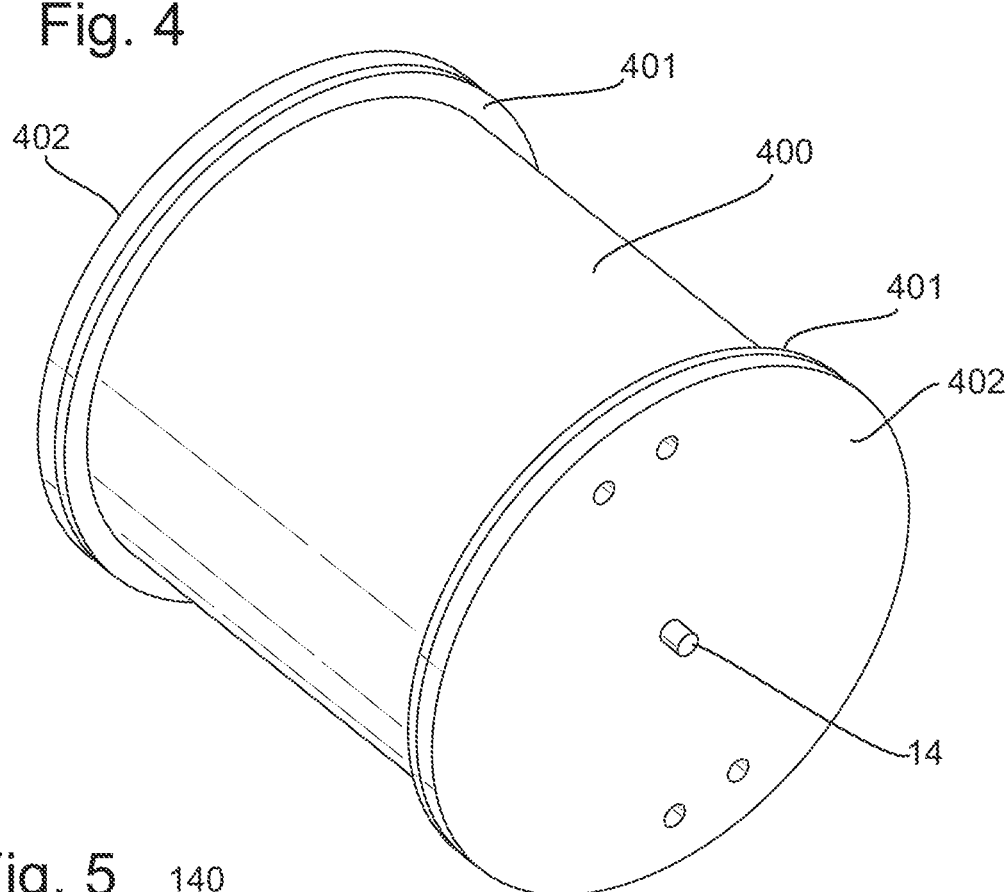
FIG. 4 shows an external view of a thermodynamic apparatus according to the present disclosure, enclosed within a casing.

Each of the compressor module 100, turbine module 200, and regenerative heat exchanger 300 are enclosed by a common casing 400. Hence the thermodynamic apparatus 10 further comprises a casing 400. As shown in FIG. 4, the casing 400 extends around the compressor module 100, turbine module 200, and regenerative heat exchanger 300.

Also as shown in FIG. 4, the casing 400 may be substantially cylindrical. That is to say, the casing 400 may be substantially cylindrical along its length. Put another way, the casing 400 may have an external surface which extends parallel to the central axis 12 along the length of the casing 400. One or both ends of the casing 400 may be provided with a flange 401 for connection with an end plate 402.

In an alternative example the casing 400 may have different alternative external geometry, while still enclosing all of the compressor module 100, turbine module 200, and regenerative heat exchanger 300.

The casing 400 may be provided as a casing assembly. Hence the casing may comprise at least two modules (i.e. elements, pieces or segments) which are assembled to form the casing 400.

Figure 2:
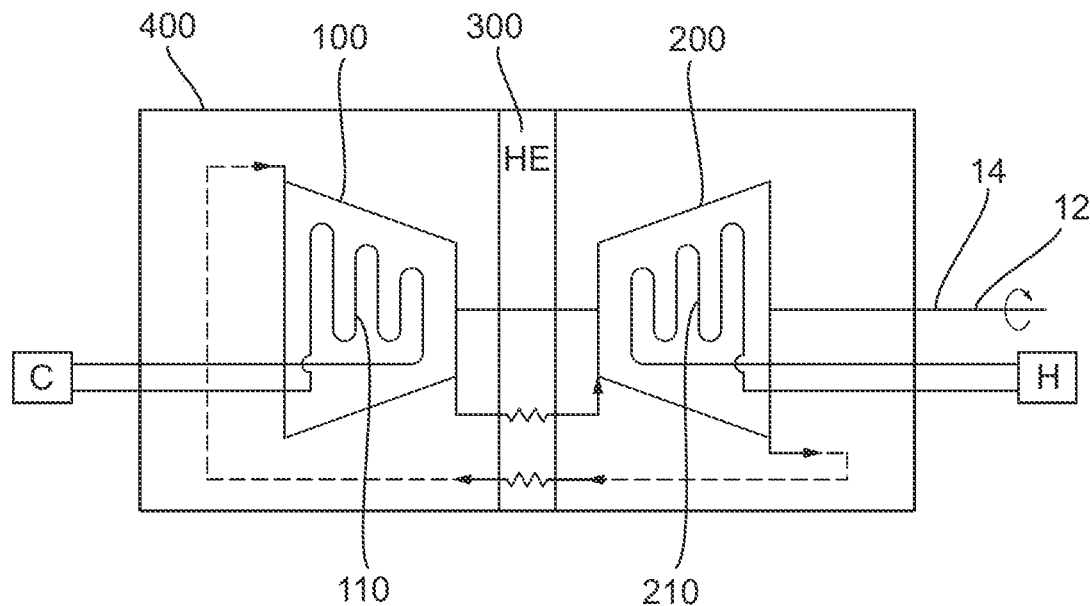
FIG. 2 is a schematic representation showing the layout of a thermodynamic apparatus according to the present invention.

The arrangements shown in FIG. 2, 3 show variations of the design shown in FIG. 1. In these the relative position of the compressor module 100, turbine module 200, regenerative heat exchanger 300 and casing 400 are shown.

As will be described, the compressor module 100 comprises heat exchangers to cool working fluid passing therethrough, and the turbine module 200 comprises heat exchangers to heat working fluid passing therethrough.

Figure 3:
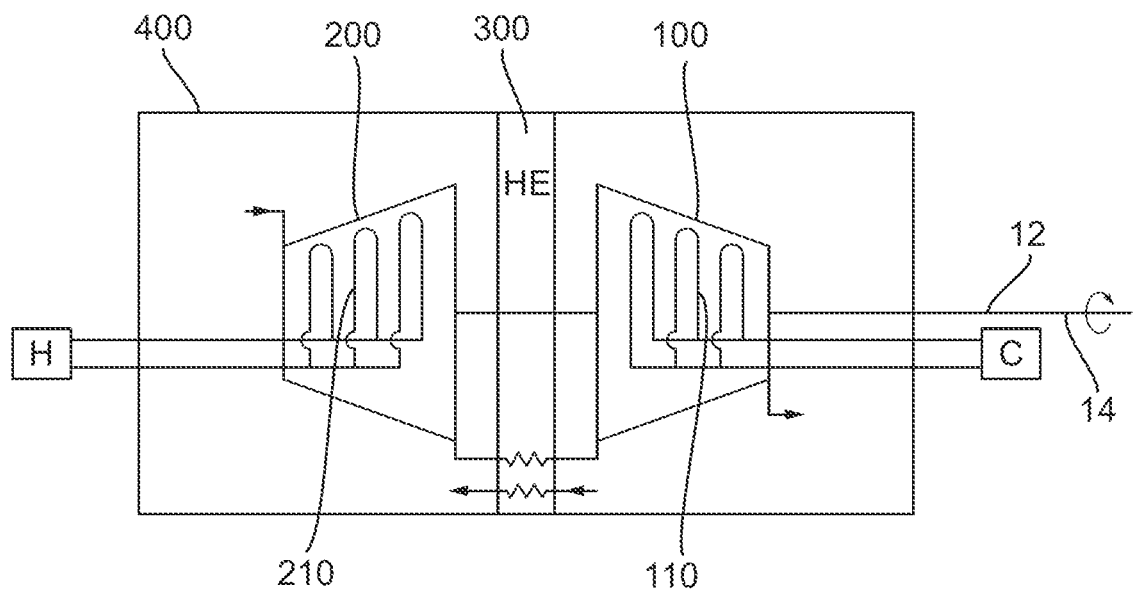
FIG. 3 is a schematic representation of an alternative configuration of a thermodynamic apparatus according to the present invention.

In FIG. 2 the low pressure side of the working fluid is contained next to the casing 400 and in a working fluid return channel. In FIG. 3 the high pressure fluid is next to the casing and in the working fluid return channel.

Figure 5:
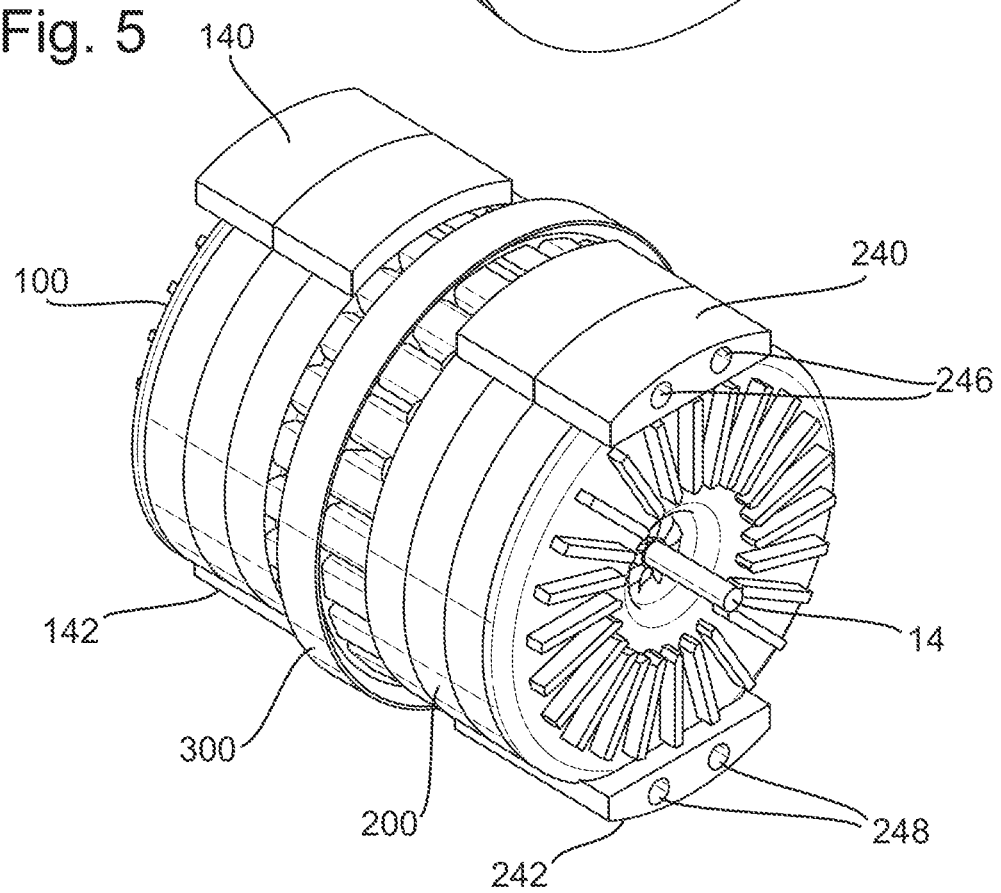
FIG. 5 shows a view of the thermodynamic apparatus shown in FIG. 4, with the casing removed.

FIG. 4 shows an example of the thermodynamic apparatus 10 when assembled, and FIG. 5 shows the apparatus 10 with the casing 400 removed. In use, the casing 400 is pressurised, and a closed cycle loop is defined by the compressor module 100, a regenerative heat exchanger 300 and turbine module 200.

As shown in FIGS. 7, 8, 9, 10, 12 to 14 the compressor module 100, a turbine module 200, and a regenerative heat exchanger 300 define a working fluid flow duct 20. The working fluid flow duct 20 defines a closed loop, and hence is configured to be a closed cycle system. The working fluid flow duct 20 extends, in series, through a compressor module inlet 102 to a compressor module outlet 122; the first path 302 through the regenerative heat exchanger 300; a turbine module inlet 202 to the turbine module outlet 222; a first intermediate duct 22 provided in (i.e. defined by) the turbine module 200; the second path 304 through the regenerative heat exchanger 300, which is in heat transfer communication with the first path 302; a second intermediate duct 24 provided in (i.e. defined by) the compressor module 100, which leads back to the compressor module inlet 102.

Figure 12:
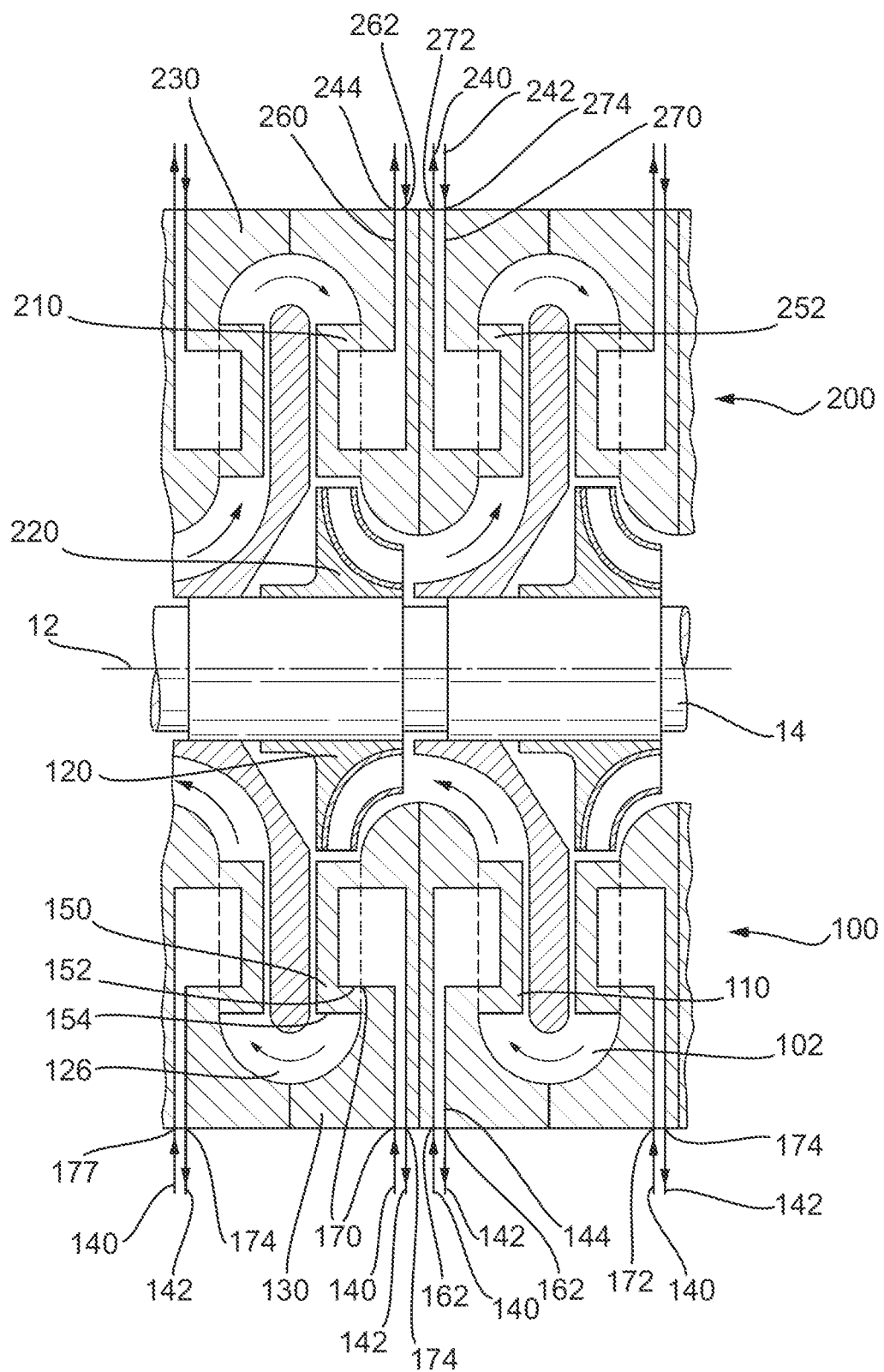
FIG. 12 shows an enlarged view of a region of an example of the thermodynamic apparatus.
Figure 13:
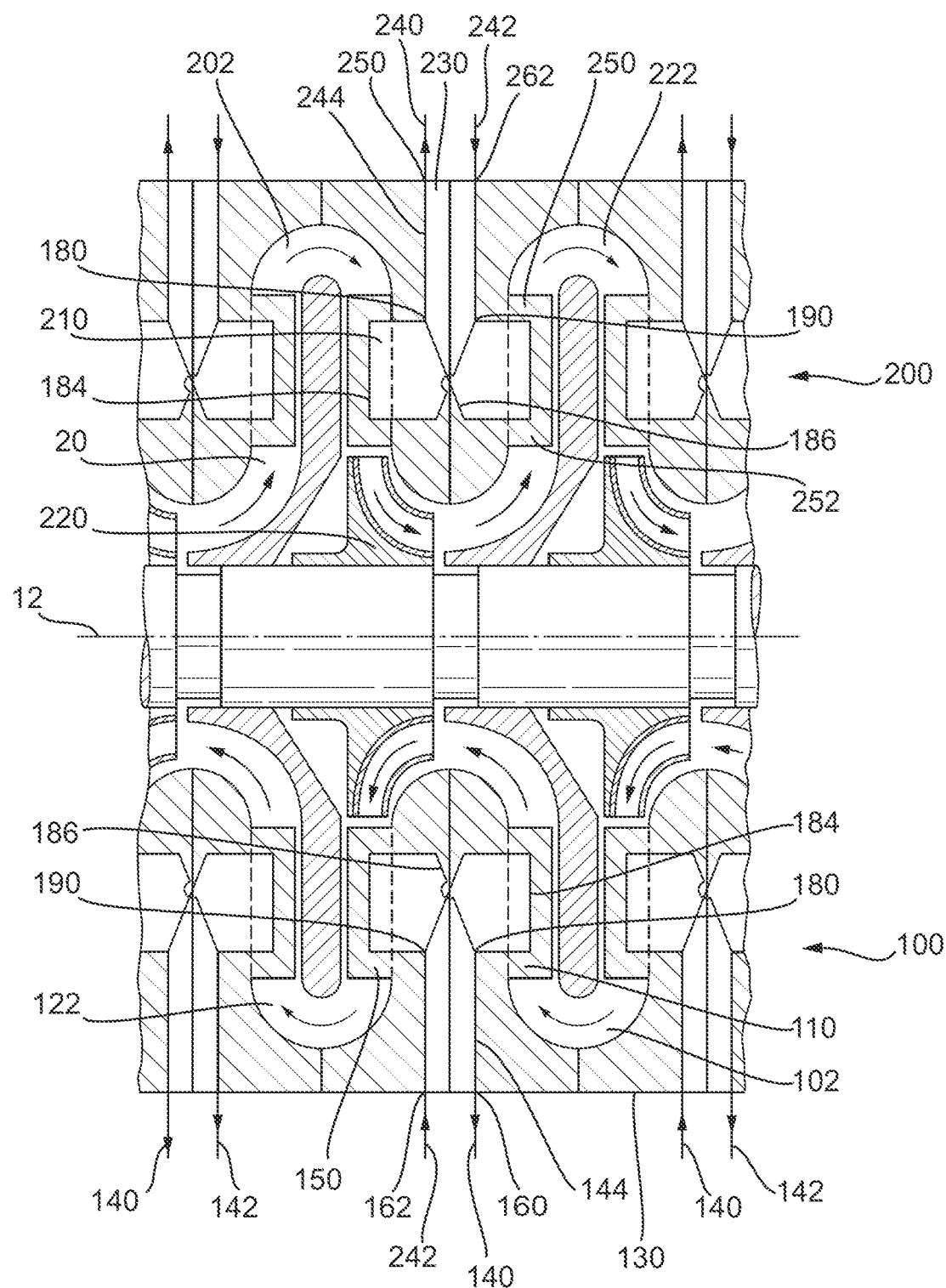
FIG. 13 shows an enlarged view of a region of an alternative example of the thermodynamic apparatus to that shown in FIG. 12.
Figure 14:
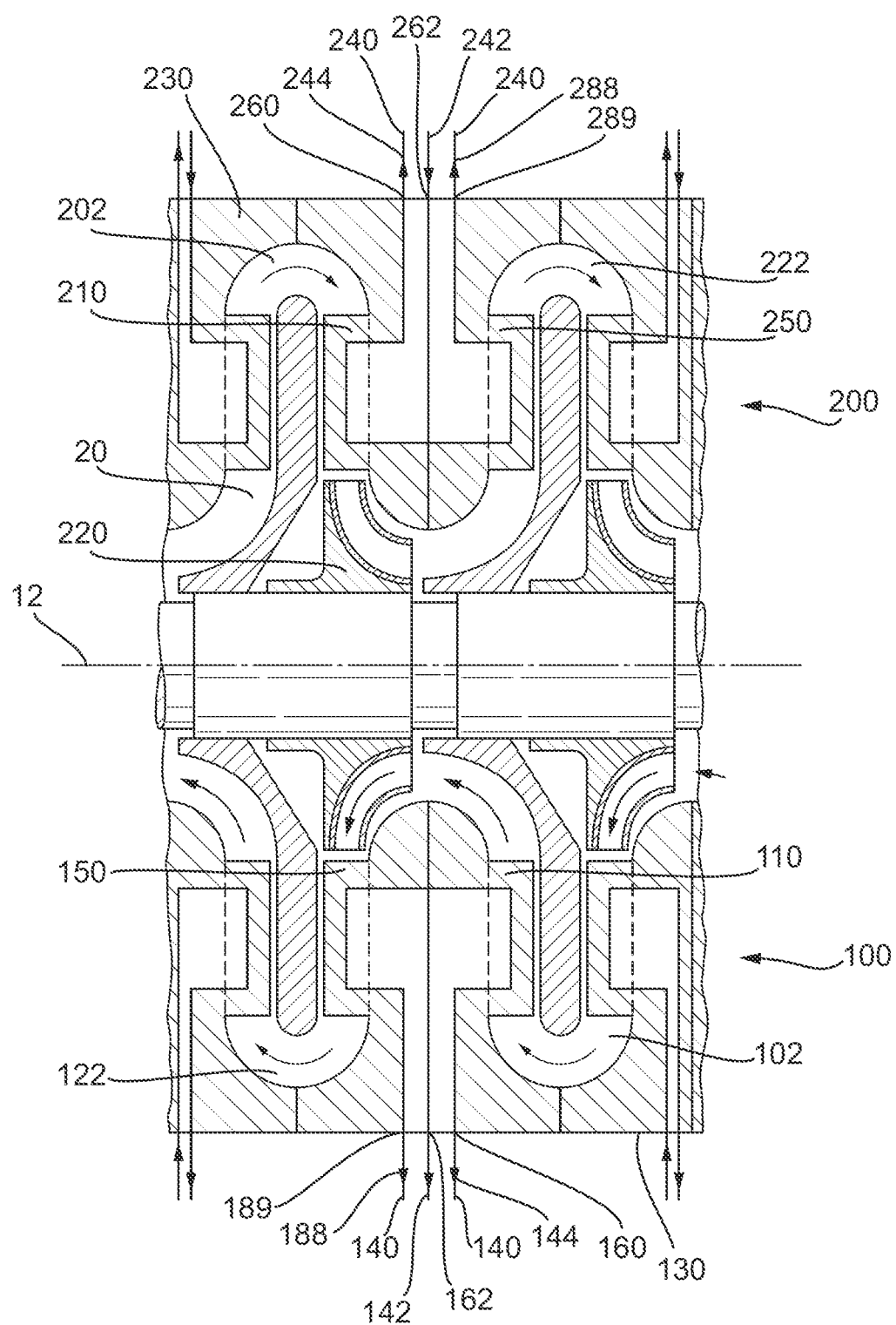
FIG. 14 shows an enlarged view of a region of an alternative example of the thermodynamic apparatus to that shown in FIG. 12 or FIG. 13.

In the example shown in FIGS. 7, 8 the thermodynamic apparatus comprises a compressor module 100 made up of two compressor stages arranged in series, and a turbine module 200 made up of two turbine stages. Each stage comprises a respective rotor 120, 220 and a first heat exchanger 110, 210. In some examples, not shown, the compressor module 100 may comprise a single compressor stage, and the turbine module 200 may comprise a single turbine stage. Hence in the description reference to the compressor or turbine module inlet or outlet may refer to the module assembly as whole (as shown in FIG. 7, 8, where the compressor inlet 102 is the inlet to the whole compressor module assembly, and the outlet 122 is the outlet for the whole compressor assembly, and the turbine inlet 202 is the inlet to the whole turbine module assembly, and the outlet 222 is the outlet for the whole turbine assembly) or to a region in the working flow duct 20 which defines the end of one stage and the beginning of another (as shown in FIGS. 12, 13, 14 where the compressor module/stage inlet 102 is shown upstream of the first heat exchanger 110 and the compressor module/stage outlet 122 is shown downstream of the second heat exchanger 150.

Figure 10:
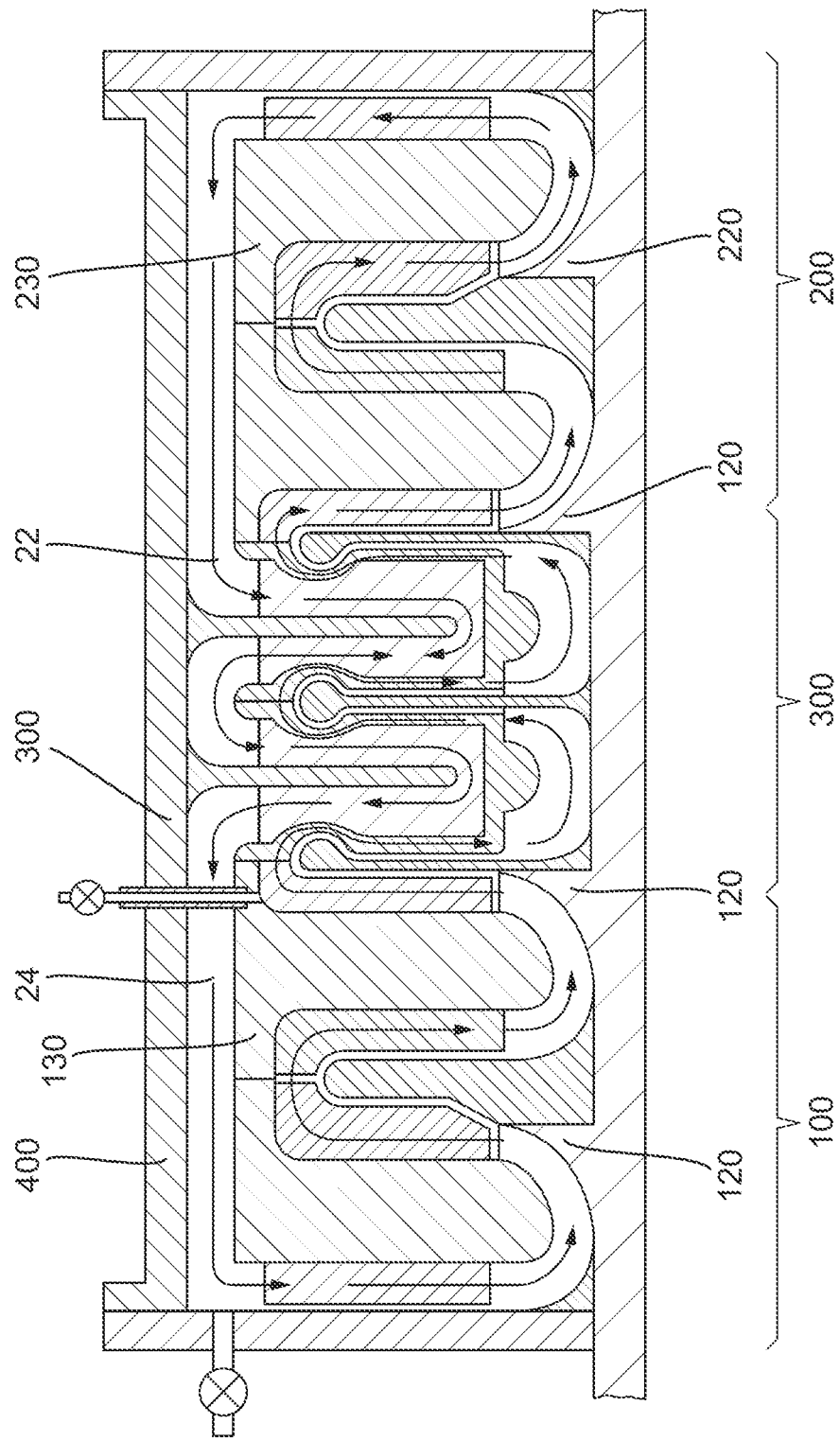
FIG. 10 shows an example similar to that shown in FIG. 8, with a double regenerative heat exchanger arrangement, and the working fluid flow paths indicated.

The regenerative heat exchanger 300 may comprise a single stage, for example as shown in FIG. 7, 8, or may comprise a plurality of stages (for example two stages) as shown in the example of FIG. 10. Hence an example comprising a plurality of stages may be operable to increase the amount of heat transferred to the working fluid passing through the working fluid flow duct 20.

As illustrated in FIG. 8, the compressor module 100 defines a first portion 26 of the working fluid flow duct 20. The first portion 26 extends between the compressor module inlet 102 and the compressor module outlet 122. In the example shown the first portion comprises two compressor modules 100. As shown in FIGS. 7, 8, 9, 10, 12 to 14, each stage of the compressor module 100 comprises a first heat exchanger 110 and the compressor rotor 120, each being provided in the working fluid flow duct 20. The first heat exchanger 110 is provided in flow series between the compressor module inlet 102 and the compressor rotor 120. The compressor rotor 120 is provided in flow series between the first heat exchanger 110 and the compressor module outlet 122. The first heat exchanger 110 is defined by a wall 112 having an external surface 114 which is located in the working fluid flow duct 20. A heat transfer unit 130 defines the first portion 26 of the working fluid flow duct 20. The first heat exchanger 110 is in heat transfer communication with the heat transfer unit 130 via a first main passage 134 for a first heat transfer medium (i.e. a coolant). The first heat exchanger 110 is configured such that it is operable to transfer heat to the heat transfer unit 130 from the working fluid passing the first heat exchanger 110.

The turbine module 200 defines a second portion 28 of the working fluid flow duct 20 which extends between a turbine module inlet 202 and a turbine module outlet 222. The turbine module 222 is configured to expand a working fluid as the working fluid passes along the working fluid flow duct 20. Each stage of the turbine module 200 comprises a first heat exchanger 210 and the turbine rotor 220, each being provided in the working fluid flow duct 20. The first heat exchanger 210 is provided in flow series between the turbine module inlet 202 and the turbine rotor 220. The turbine rotor 220 is provided in flow series between the first heat exchanger 210 and the turbine module outlet 222. The first heat exchanger 210 is defined by a wall 212 having an external surface 214 which is located in the working fluid flow duct 20. A heat transfer unit 230 defines a portion 232 of the working fluid flow duct 20 in flow series between the turbine rotor 220 and turbine module outlet 222. The first heat exchanger 210 is in heat transfer communication with the heat transfer unit 230 via a second main passage 234 for a second heat transfer medium. The first heat exchanger 210 is configured such that it is operable to transfer heat received from the heat transfer unit 230 to the working fluid passing the first heat exchanger 210.

As shown in figures, the working fluid flow duct 20 may be serpentine. That is to say the working fluid flow duct may comprise a plurality of sections which extend at an angle, for example at a right angle, to the central rotational axis 12. Put another way, the working fluid flow duct 20 may comprise a number of sections which extend radially relative to the central rotational axis 12. The radially extending sections may be joined by longitudinally extending or curved sections. That is to say the radially extending sections may be linked to one another by further sections which extend in a direction which has a component which extends parallel to the central axis 12. These further/joining sections are in part defined by the rotor stages 120, 220. The heat exchangers 110, 150, 210, 250 are located in the radially extending sections of the working fluid flow duct 20. Providing the working fluid flow duct 20 with a serpentine configuration means that the surface area of the working fluid flow duct 20 may be maximised for the length of the apparatus 10.

The working fluid flow duct 20 may have such a serpentine flow route through each of the compressor stage(s), turbine stage(s) and regenerative heat exchanger stage(s).

As shown in FIGS. 6, 7, 9, 11 the first main passage 134 of the compressor module 100 and second main passage 234 of the turbine module 200 each comprise an inlet plenum 140, 240 and an outlet plenum 142, 242. The inlet plenum 140 and outlet plenum 142 of the compressor 100 are in fluid flow communication via a compressor first sub-passage 144 defined by the compressor heat transfer unit 130 for the transfer of the respective heat transfer medium through the compressor first heat exchanger 110. The inlet plenum 240 and outlet plenum 242 of the turbine 100 are in fluid flow communication via a turbine first sub-passage 244 defined by the turbine heat transfer unit 230 for the transfer of the respective heat transfer medium through the turbine first heat exchanger 210.

Each inlet plenum 140, 240 has an inlet 146, 246 for communication with a different source of heat transfer medium, and each outlet plenum 142, 242 has an outlet 148, 248 to exhaust the respective heat transfer medium. That is to say, the compressor inlet plenum 142 has an inlet 146 for communication with a source of a heat transfer medium which is a cooling medium (i.e. a coolant) and the compressor outlet plenum 142 has an outlet 148 to exhaust the coolant from the first main passage 134. Likewise the turbine inlet plenum 242 has an inlet 246 for communication with a source of heating medium (for example a heated fluid), and the turbine outlet plenum 240 has an outlet 248 to exhaust the heating medium from the second main passage 234.

Figure 11:
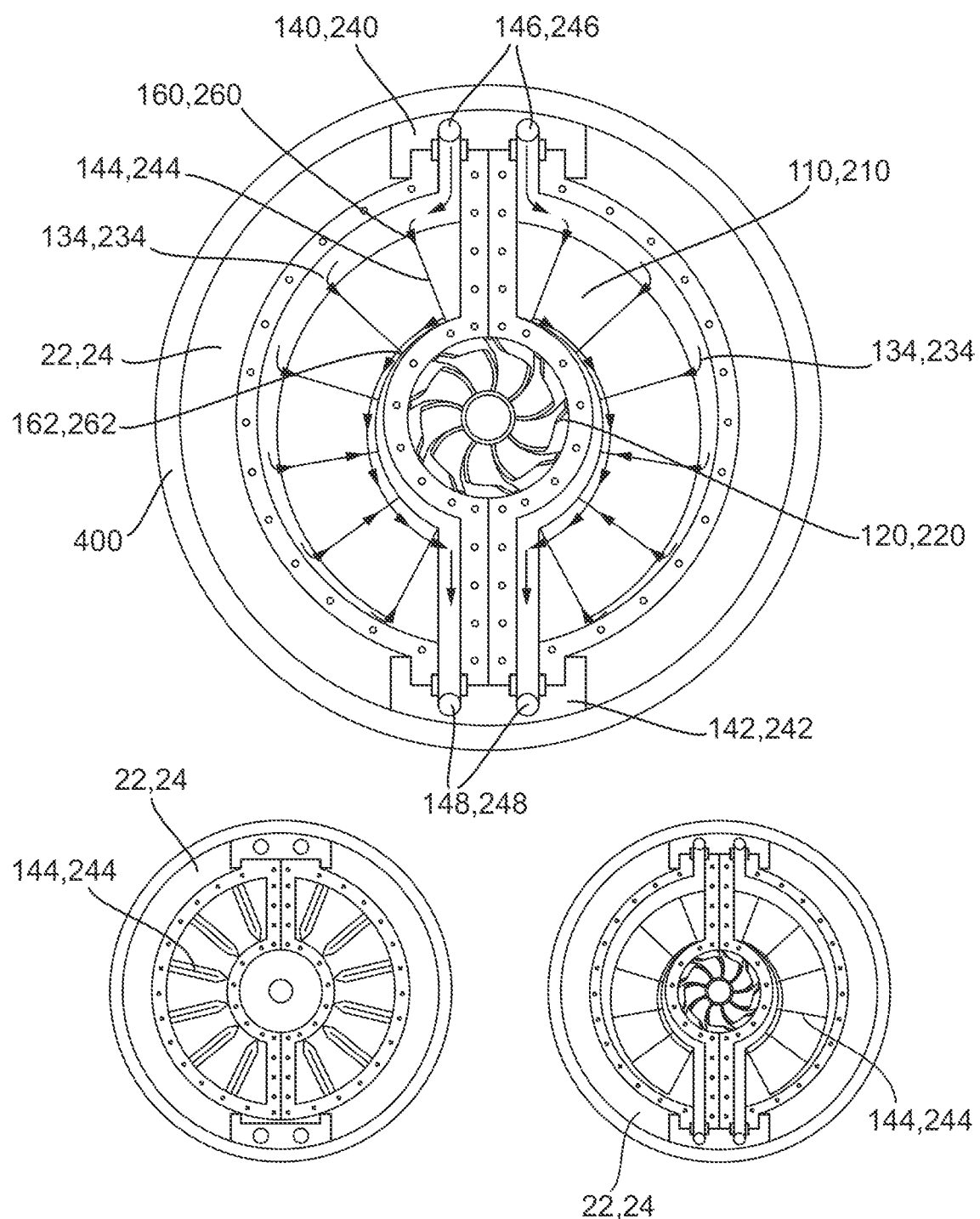
FIG. 11 shows a cross-sectional view of the thermodynamic apparatus shown in FIG. 4.

As shown in FIGS. 7, 7A, 11, 12 to 14 the first sub-passages 144, 244 of the compressor module and turbine module extend through the first heat exchanger 110, 210. FIG. 7A shows an alternative arrangement to that shown in FIG. 7, and may be applied to the compressor module and/or turbine module heat exchangers. FIG. 11 shows a sectional view of a compressor 100 and/or turbine 200 according to the present invention. That is to say, the compressor 100 and turbine 200 may have the same features as one another, and the features are indicated in FIG. 11 using reference numerals of the compressor 100 and turbine 200. In FIGS. 12, 13, 14 the top half of the figure relate to the turbine module 200 (with flow through the working fluid flow duct 20 being from left to right), and the bottom half of the figures relate to the compressor module 100 (with flow through the working fluid flow duct 20 being from right to left). The first heat exchanger 110, 210 is in flow series between a first inlet 160, 260 to the first sub-passage 144, 244 and a first outlet 162 from the first sub-passage 144, 244. The first inlet 160, 260 is configured to receive heat transfer medium from the inlet plenum 140, 240. The first outlet 162, 262 is configured to exhaust into the outlet plenum 142, 242.

As shown in FIGS. 7 to 10, 12 to 14 each stage of the compressor module 100 may comprise a second heat exchanger 150 located in the working fluid flow duct 20 in flow series between the compressor rotor 120 and the compressor module outlet 122 in the heat transfer unit 130. The compressor second heat exchanger 150 is defined by a wall 152 having an external surface 154 which is located in the working fluid flow duct 20. The second heat exchanger 150 is configured such that it is operable to transfer heat to the heat transfer unit 130 from the working fluid passing the second heat exchanger 150.

Each stage of the turbine module 200 may comprise a second heat exchanger 250 which is located in the working fluid flow duct 20 in flow series between the turbine rotor stage 220 and the turbine module outlet 222 in the heat transfer unit 230. The compressor second heat exchanger 250 defined by a wall 252 having an external surface 254 which is located in the working fluid flow duct 20. The second heat exchanger 250 is configured such that it is operable to transfer heat received from the heat transfer unit 230 to the working fluid passing the second heat exchanger 250.

Hence since a compressor module 100 and a turbine module 200 may comprise multiple stages, there may be several pairs of first heat exchangers and second heat exchangers in the working fluid flow duct 20 defined by each of the compressor module and turbine module. In an alternative example the compressor module and turbine module may comprise a single stage, in which case only a first heat exchanger and second heat exchanger may be provided in the section of the working fluid flow duct 20 which extends through each of the compressor module 100 and turbine module 200.

In each of the compressor module 100 and turbine module 200 the first sub-passage 144, 244 extends through the second heat exchanger 150, 250.

As shown in the example of FIG. 12, in each of the compressor module 100 and turbine module 200 a second sub-passage 170, 270 extends through the second heat exchanger 150, 250. The second heat exchanger 150, 250 is in flow series between a second inlet 172, 272 to the second sub-passage 170, 270 and a second outlet 174, 274 from the second sub-passage 170, 270. The second inlet 172, 272 is configured to receive heat transfer medium from the inlet plenum 140, 240. The second outlet 174, 274 is configured to exhaust into the outlet plenum 142, 242.

In each of the compressor module 100 and turbine module the first heat exchanger 110, 210 is provided in series along/in the first sub-passage 144, 244 between the first inlet 160, 260 and the second heat exchanger 150, 250, and the second heat exchanger 150, 250 is provided in flow series between the first heat exchanger 110, 210 and the first outlet 162, 262 from the first heating medium flow sub-passage 144, 244.

As shown in an alternative example of FIG. 13 the first sub-passage 144, 244 may comprise a first node 180 between the first inlet 160, 260 and the first heat exchanger 110, 210 where the sub-passage splits/diverges to form a first branch 184 and second branch 186. A second node 190 is provided between the outlet 162, 262 and the second heat exchanger 150, 250 where the first branch 184 and second branch 186 join. The first branch 184 of the first sub-passage 144,244 extends through the first heat exchanger 110, 210 and bypasses the second heat exchanger 150, 250. The second branch 186 bypasses the first heat exchanger 110, 210 and extends though the second heat exchanger 150, 250.

As shown in an alternative example of FIG. 14 the first sub-passage 144, 244 may comprise a third sub-passage 188, 288 which extends from a second inlet 189, 289 in fluid communication with the inlet plenum 140, 240 through the second heat exchanger 150, 250. The third sub-passage 188, 288 joins the first sub-passage 144,244 between the outlet of the first heat exchanger 110, 210 and first sub-passage outlet 144, 244 such that flow through the first inlet 160, 260 and second inlet 189, 289 exit through the first outlet 162, 262.

In FIGS. 12 to 14 the connection to the plenums 140, 142 and 240 242 is indicated with arrows, which indicates that at the inlets and outlets to the sub-passages there is a fluid connection to the plenums.

Figure 16:
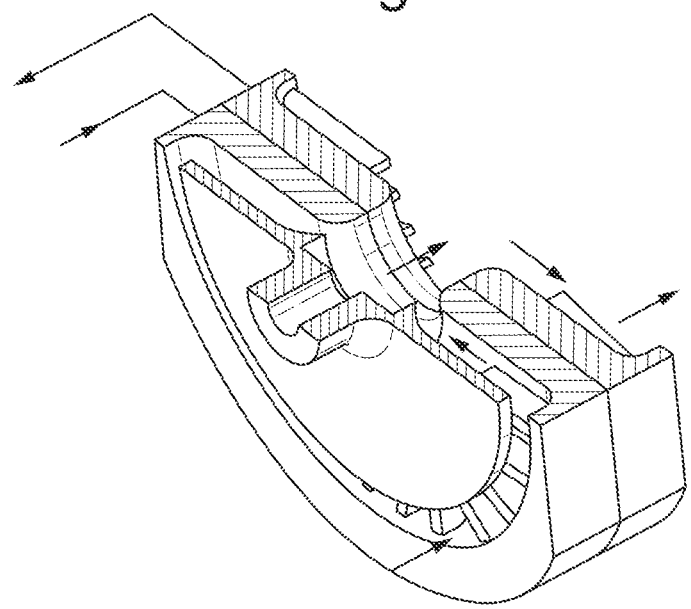
FIG. 16 shows a sectional view of a heat exchanger assembly of the thermodynamic apparatus.

FIG. 16 shows a 3d image of the heat exchange module in FIG. 13—heat exchange fluid is supplied and returned from a single supply and return which simplifies the heating and cooling supplies at the expense of efficiency.

Figure 15:
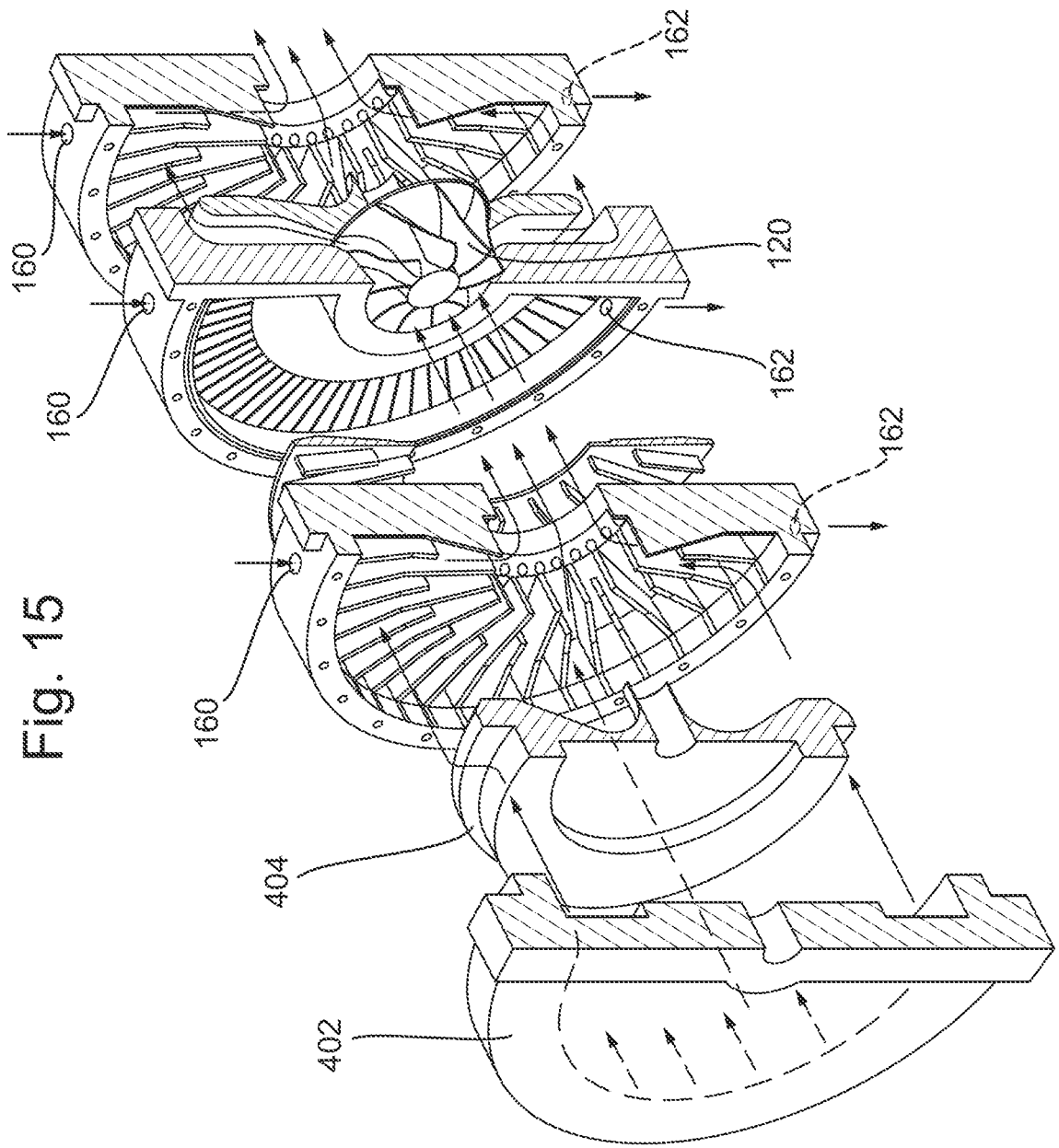
FIG. 15 shows an exploded view of an example of a thermodynamic apparatus according to the present disclosure.

FIG. 15 shows an alternative exploded view of a compressor module of the thermodynamic apparatus, although equally applies to a turbine module. It shows flow paths through and defined by a casing section 402, working fluid flow guide 404 and sections of the heat transfer unit 130. The first inlet 160 to the first sub-passage 144 and first outlet 162 are shown.

A key feature of the design is that plates are used to create the heat exchangers. For example, two machined inner casing plates are used to create a single sealing face, which is clamped together using a bolted joint arrangement. The internal surface/volume of this pair of plates hold the heat transfer fluid, with a single sealing surface. The plates clamp around a flow path guide assembly. This fits within slotted holes which define heat exchangers and restricts the flow of the heat transfer fluid to the optimum path through the space. This can be made up from a single flat plate, with a number of slotted holes which a number of shaped guide plates fit into, or a single machined or 3d printed item. When connected together these three plates create a heat exchanger with the heat transfer fluid contained within the inner casing plates.

FIG. 16 shows a sectional view of a heat exchanger assembly of the thermodynamic apparatus shown in FIG. 13. In this example three cross-linked internal heat transfer flow passages are provided, so only one supply and return is required, for example as shown in FIG. 14.

Figure 17:
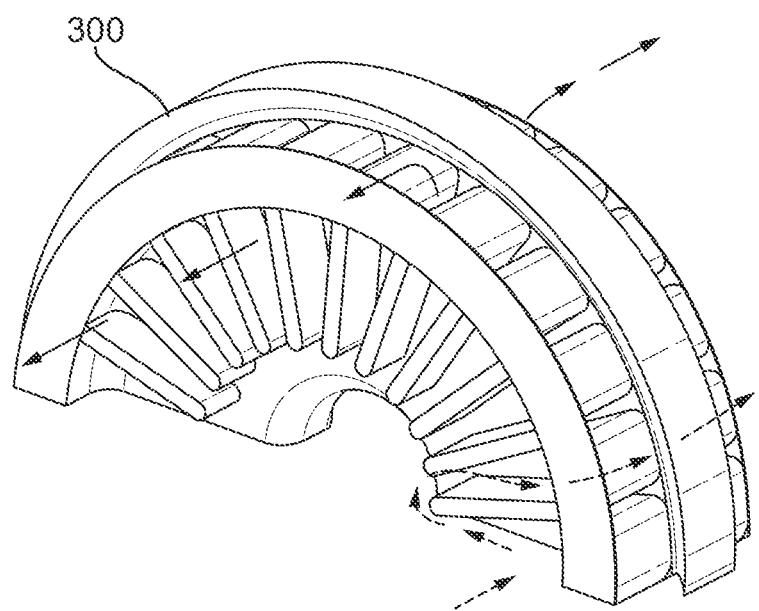
FIG. 17 shows a sectional view of a regenerative heat exchanger of the thermodynamic apparatus.

FIG. 17 shows a sectional view of a regenerative heat exchanger of the thermodynamic apparatus. FIG. 17 shows one half of the regenerative heat exchanger assembly. Rounded edges are shown on the inlet/outlet of the low pressure side slots which improve air flow.

Figure 18:
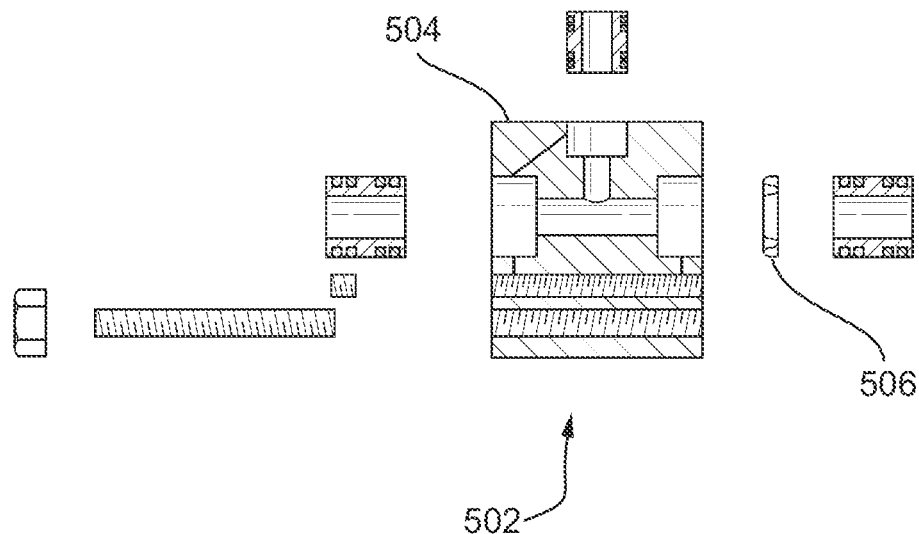
FIGS. 18 to 21 show different elements of the compressor, turbine and plenum structures of the thermodynamic apparatus.
Figure 19:
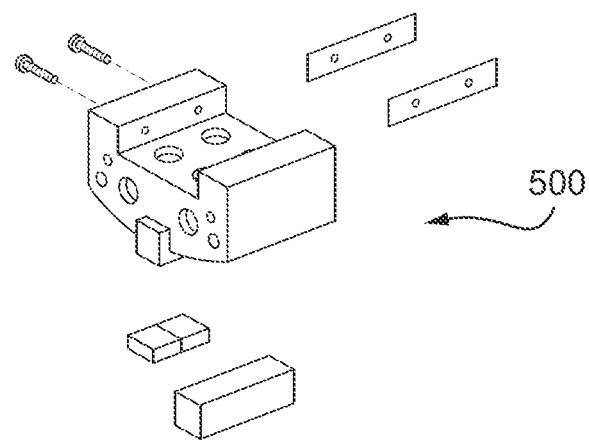
Figure 20:
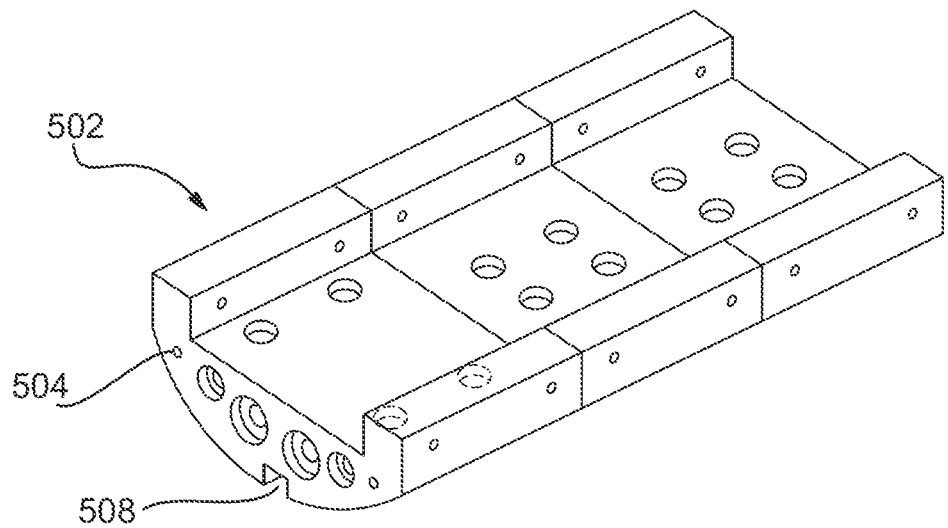

FIGS. 18 to 21 show different elements of the compressor, turbine and plenum structure of the thermodynamic apparatus. FIGS. 18 to 20 show possible combined structural support arrangements and components which make up the supply and return plenum detailed as parts 140, 142, 240 and 242. This provides support to the compressor and turbine structure and also a means of simple manufacture of the support assembly.

In FIG. 18 there is shown supply and return 502 of hot and cold heat exchange fluid. Also shown is a return 504 for seal leak/control line and a sliding seal 506 for supply and return.

In FIG. 19 there is shown a support structure 500 for the internal stages.

In FIG. 20 is shown internal restraints 508. FIG. 20 shows a possible arrangement where there are multiple plenums to allow for increased heat transfer fluid flow. It also allows for the return of fluid from the seal drains. The seal drains allow leaking fluid to be captured and re-used.

Figure 21:
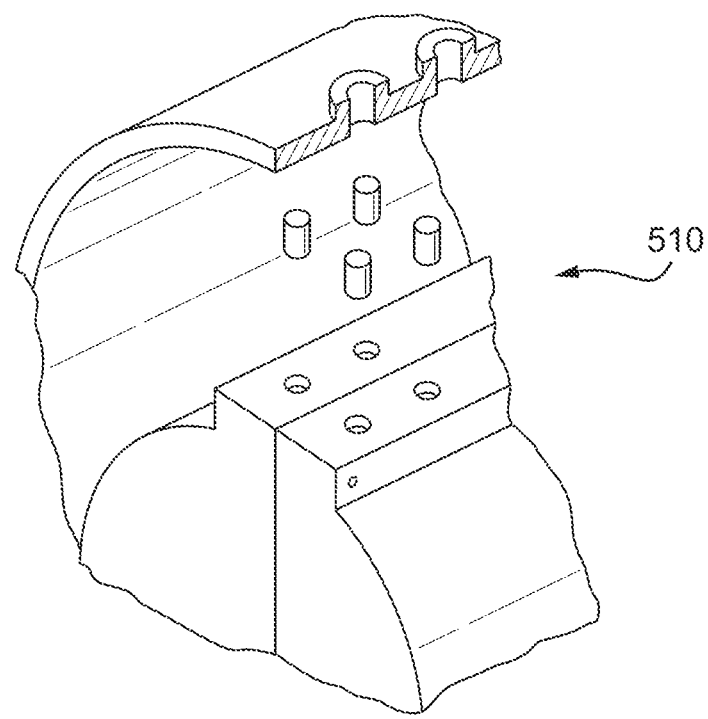

In FIG. 21 is shown alternative arrangements 510 for supply and return of heat transfer fluids.

For simplicity, only barrel type arrangements are shown but equivalent horizontal and vertical split casing designs are possible to allow for assembly.

Figure 22:
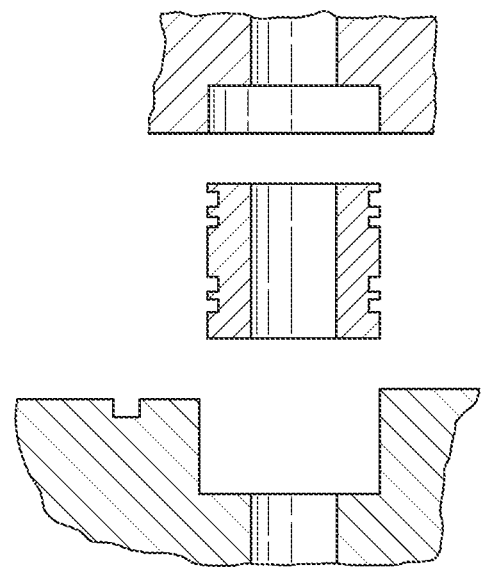
FIG. 22 shows a sealing arrangement of use in the apparatus of the present disclosure.

FIG. 22 shows a sealing arrangement of use in the apparatus of the present disclosure.

Figure 23:
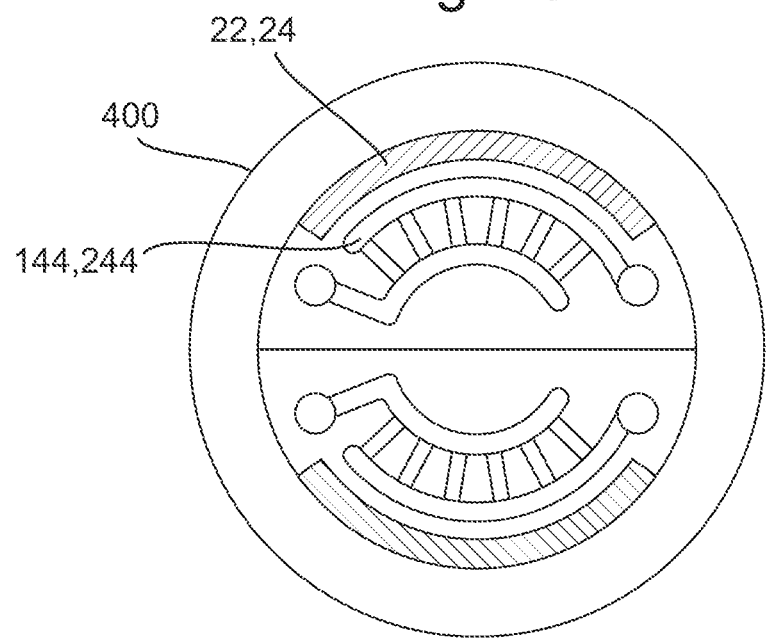
FIG. 23 shows a sectional view of the thermodynamic apparatus shown in FIG. 7.

FIG. 23 shows a sectional view of the thermodynamic apparatus shown in FIG. 7. FIG. 23 shows a cross section with a horizontal rather than vertical split in the turbine and compressor casing.

Figure 24:
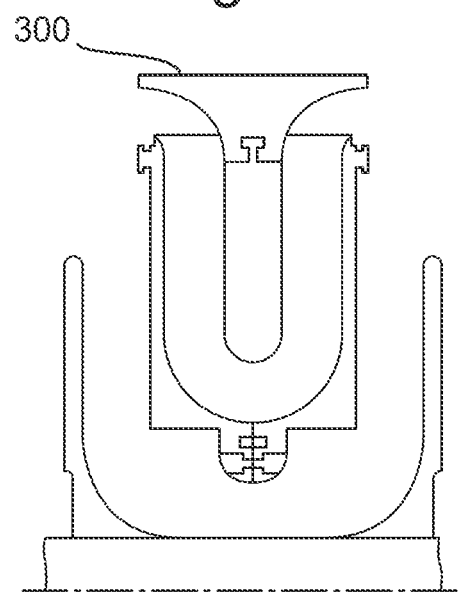
FIGS. 24, 25 shows example configurations of regenerative heat exchangers which form a part of the thermodynamic apparatus.
Figure 25:
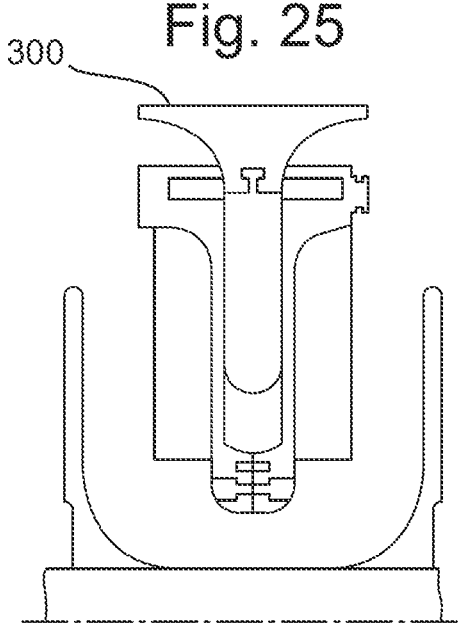
Figure 26:
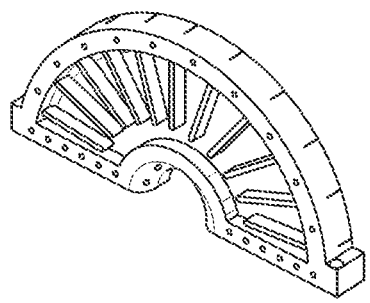
FIGS. 26 to 31 illustrate example components of the heat exchanger shown in FIG. 16.
Figure 27:
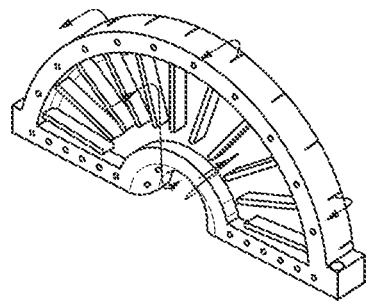
Figure 28:
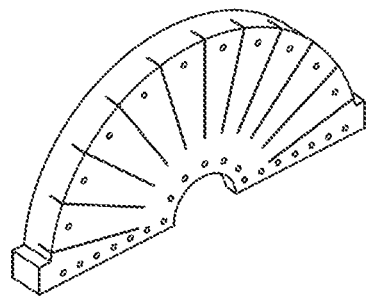
Figure 29:
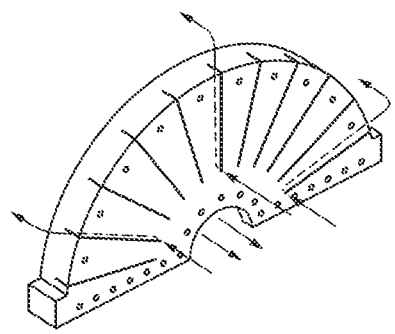
Figure 30:
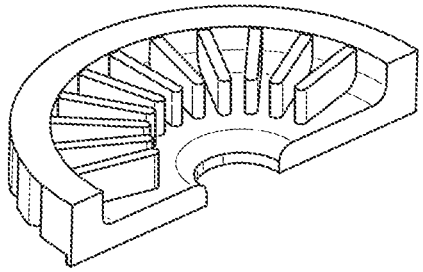
Figure 31:
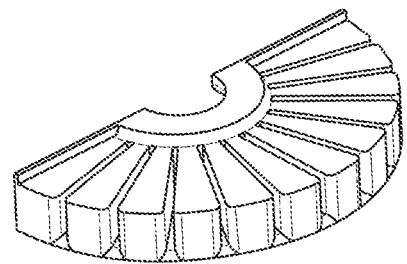

FIGS. 24, 25 shows detailed views of a regenerative heat exchanger which forms a part of the thermodynamic apparatus.

FIGS. 26 to 31 illustrate example components of the regenerative heat exchanger shown in FIG. 16.

FIGS. 32, 33 shows an example component of the regenerative heat exchanger shown in FIG. 16.

Figure 34:
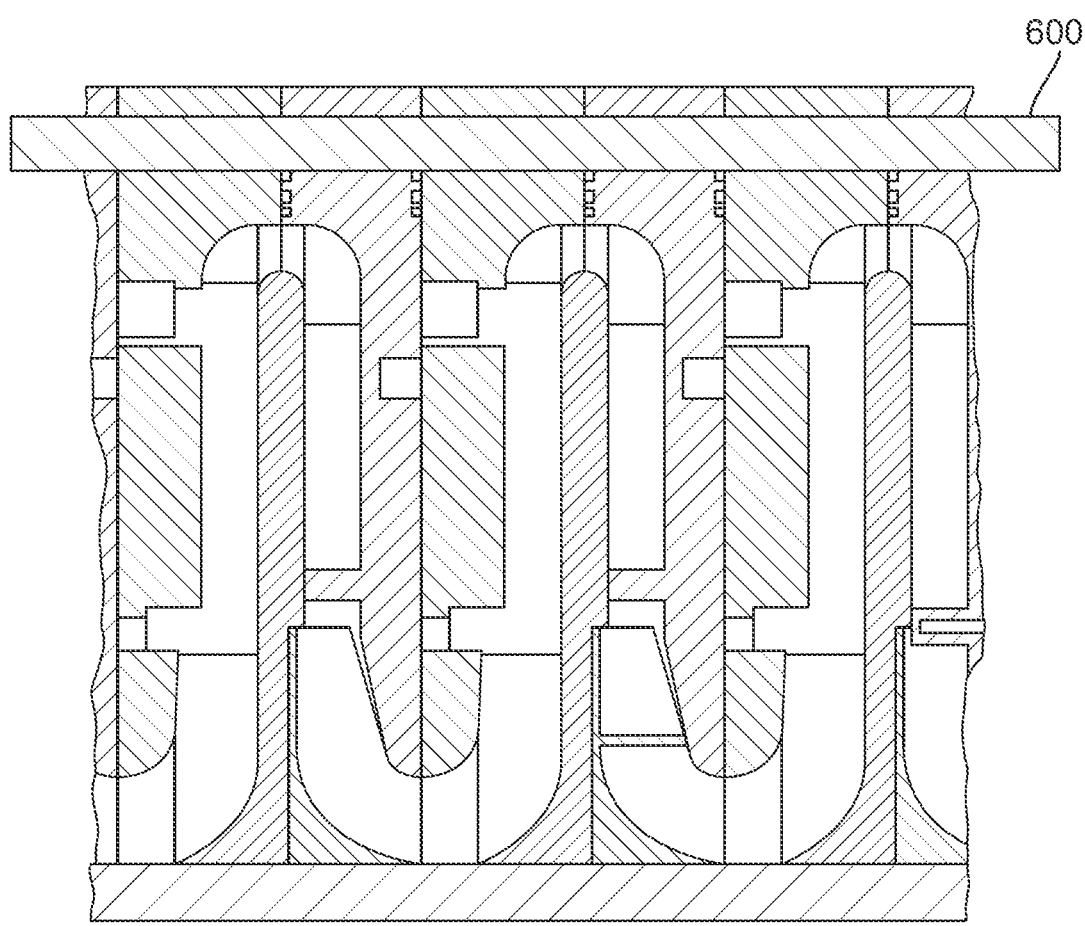
FIG. 34 shows and example assembly of the thermodynamic apparatus.

FIG. 34 shows an alternative arrangement which can be used to support a set of multiple heat exchanger assemblies, for insertion into a barrel type casing. An arrangement of long studs or bolts 600 pass through all of the plates. Dowels which link the plate faces (in shear) allow for the casing to be accurately assembled.

The thermodynamic apparatus may be configured to operate as a heat engine. With reference to FIGS. 7, 8, 10, in use, the operation of the thermodynamic apparatus involves coupling the inlet plenum 140 to a heat sink (e.g. source of cold fluid) and the coupling of the inlet plenum 242 a heat source, so that each are supplied with a heat transfer fluid/medium. The heat transfer fluid in the first main passage 134 must be provided to be colder than the heat transfer fluid in the second main passage 234. The outlet plenum 142 in outlet plenum 242 may exhaust back to the heat sink and heat source respectively, or maybe the directed elsewhere. A working fluid is provided in the working fluid flow duct 20.

The different heat transfer fluid fluids are pumped from their source, through the main passages 134, 234 and leave the apparatus. This temperature differential causes the flow of the working fluid through the working fluid flow duct 20.

The working fluid will travel around the working fluid flow duct 20 from the compressor module inlet 102, through the compressor module 100 to the compressor module outlet 122, then through the first path 302 through the regenerative heat exchanger 300, then through the turbine module inlet 202, through the turbine module 200 to the turbine module outlet 222, then through the first intermediate duct 22, then through the second path 304 through the regenerative heat exchanger 300, which is in heat transfer communication with the first path 302, and through the second intermediate duct 24 to the compressor module inlet 102.

The flow of working fluid results in the turning of the rotors 120, 220 and hence turning the shaft 12 which may be coupled to a power offtake, and hence be used to drive another piece of apparatus, for example a generator.

The power output of the machine can be controlled through the addition and removal of working fluid from the system (increasing and decreasing the pressure and density of the fluid) or by altering the rotational speed of the rotor and shaft. Ideal positions for this which allow for addition and removal of working fluid without an additional compressor are shown in FIG. 8.

In an alternative example, the thermodynamic apparatus may be configured to operate as a heat pump. In such an example the shaft 14 is driven by a motor to move the working fluid around the working fluid flow duct 20, causing heat exchange across the regenerative heat exchanger to transfer heat from the heat transfer medium in the compressor to the heat transfer medium in the turbine. In such an example the compressor temperature would be higher than the turbine temperature.

The configuration of the apparatus of the present disclosure results in a heat engine or heat pump of increased thermal efficiency and power output, and hence one that provides reduced running costs compared to examples of the related art. Hence a thermodynamic apparatus according to the present disclosure will be smaller and cheaper than examples of the related art, giving a significant competitive advantage.

The internal routing of the heat exchangers of the compressor and turbine increases heat transfer and hence effectiveness of the cooling of working fluid passing through the compressor and heating are working fluid passing through the turbine.

The improved design for electrical power production marine or other propulsion arrangements (for example engines/power units for trains) of this invention can provide a benefit by decreasing fuel consumption (i.e. increasing the range or performance of vessels), by minimising the need for high pressure fluid pipework (i.e. providing a safe design concept) and by simplifying the supporting systems required to operate propulsion equipment (i.e. cheaper and simpler design).

The apparatus of the present disclosure is encapsulated in a single casing, reducing part count, overall size of the machine, reduced piping (resulting in lower losses), reduced sealing requirements, and removes the need for external regenerative heat exchangers. This improves the efficiency of the machine.

The turbine module and compressor module of the present disclosure may increase the thermal efficiency of a heat engine or heat pump in which they are included over currently available systems and has reduced requirements for space and supporting systems over conventional power generation and cooling equipment having similar thermal efficiency. This has the effect of making equipment of the present disclosure cheaper than the alternatives for the same power rating, giving a significant competitive advantage.

The apparatus of the present disclosure may be employed as constant speed machinery for electrical power production (for example where a heat source is created to drive a turbine). It may also be used in constant speed machinery for electrical power using fuels or heat sources. It may also have utility as variable speed machinery for marine or other propulsion.

Both electrical power production and the marine propulsion arrangements of apparatus of the present invention may provide benefit maritime applications by decreasing fuel consumption, and hence increasing the range or performance of vessels, by minimising the need for high pressure fluid pipework (making a safer product) and by simplifying the supporting systems required to operate the propulsion equipment (i.e. making cheaper and simpler design).

It may also find application in power production from any heat source (as described previously) including commercial power plants, traditional fossil fuel fired power stations, combined cycle power stations, geothermal power and automotive applications.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A thermodynamic apparatus comprising:
    a compressor module;
    a turbine module; and
    a regenerative heat exchanger;
    wherein the compressor module, turbine module, and regenerative heat exchanger define a working fluid flow duct which extends, in series, through (i) a compressor module inlet to a compressor module outlet, (ii) a path through the regenerative heat exchanger, and (iii) a turbine module inlet to a turbine module outlet;
    wherein each of the compressor module, turbine module, and regenerative heat exchanger are centered on a central axis, and arranged in series along the central axis such that the regenerative heat exchanger is provided between the compressor module and the turbine module;
    wherein the compressor module comprises:
        a first heat exchanger and a compressor module rotor, each provided in the working fluid flow duct, the first heat exchanger provided in flow series between the compressor module inlet and the compressor module rotor, and the compressor module rotor provided in flow series between the first heat exchanger and the compressor module outlet; and
        a first heat transfer unit,
            wherein the first heat exchanger is in heat transfer communication with the first heat transfer unit via a first main passage for a first heat transfer medium;
    wherein the turbine module comprises a second heat exchanger and a turbine module rotor, each provided in the working fluid flow duct, the second heat exchanger provided in flow series between the turbine module inlet and the turbine module rotor, the turbine module rotor provided in flow series between the second heat exchanger and the turbine module outlet, and a second heat transfer unit, wherein the second heat exchanger is in heat transfer communication with the second heat transfer unit via a second main passage for a second heat transfer medium.

2. The thermodynamic apparatus of claim 1, further comprising:

a shaft centered on, and rotatable about, the central axis;

the shaft extending through the compressor module, the turbine module, and the regenerative heat exchanger;

both the compressor module rotor and the turbine module rotor being carried on and rotatable with the shaft.

3. The thermodynamic apparatus of claim 2, wherein the path is a first path, and the working fluid flow duct extends, in series, through:

the compressor module inlet to the compressor module outlet;

the first path through the regenerative heat exchanger;

the turbine module inlet to the turbine module outlet;

a first intermediate duct;

a second path through the regenerative heat exchanger, which is in heat transfer communication with the first path; and a second intermediate duct to the compressor module inlet.

4. The thermodynamic apparatus of claim 3, wherein the compressor module defines a portion of the working fluid flow duct which extends between the compressor module inlet and the compressor module outlet, and wherein:

the first heat transfer unit defines the portion of the working fluid flow duct; and the first heat exchanger is configured such that it is operable to transfer heat to the first heat transfer unit from working fluid passing the first heat exchanger.

5. The thermodynamic apparatus of claim 4, wherein the portion of the working fluid flow duct is a first portion of the working fluid flow duct, and the turbine module defines a second portion of the working fluid flow duct which extends between the turbine module inlet and the turbine module outlet configured to expand a working fluid as the working fluid passes along the working fluid flow duct, wherein:

the second heat transfer unit defines the second portion of the working fluid flow duct in flow series between the turbine module rotor and the turbine module outlet; and the second heat exchanger is configured such that it is operable to transfer heat received from the second heat transfer unit to working fluid passing the second heat exchanger.

6. The thermodynamic apparatus of claim 5, wherein the first main passage of the compressor module and second main passage of the turbine module each comprise an inlet plenum and an outlet plenum, and the inlet plenum and outlet plenum of the compressor module are in fluid flow communication via a first sub-passage defined by the first heat transfer unit for the transfer of the first heat transfer medium through the first heat exchanger, and the inlet plenum and outlet plenum of the turbine module are in fluid flow communication via a second sub-passage defined by the second heat transfer unit for the transfer of the second heat transfer medium through the second heat exchanger, each inlet plenum having an inlet for communication with a different source of heat transfer medium, and each outlet plenum having an outlet to exhaust the respective heat transfer medium.

7. The thermodynamic apparatus of claim 6, wherein:

the first sub-passage extends through the first heat exchanger, and the first heat exchanger is in flow series between a first inlet to the first sub-passage and a first outlet from the first sub-passage, the first inlet configured to receive the first heat transfer medium from the inlet plenum of the compressor module, and the first outlet being configured to exhaust into the outlet plenum of the compressor module; and the second sub-passage extends through the second heat exchanger, and the second heat exchanger is in flow series between a second inlet to the second sub-passage and a second outlet from the second sub-passage, the second inlet configured to receive the second heat transfer medium from the inlet plenum of the turbine module, and the second outlet being configured to exhaust into the outlet plenum of the turbine module.

8. The thermodynamic apparatus of claim 6, wherein:

the compressor module comprises a third heat exchanger located in the working fluid flow duct in flow series between the compressor module rotor and the compressor module outlet in the first heat transfer unit, and the third heat exchanger is configured to be operable to transfer heat to the first heat transfer unit from the working fluid passing the third heat exchanger;

the turbine module comprises a fourth heat exchanger located in the working fluid flow duct in flow series between the turbine module rotor and the turbine module outlet in the second heat transfer unit, and the fourth heat exchanger being configured such that it is operable to transfer heat received from the second heat transfer unit to the working fluid passing the fourth heat exchanger;

the first sub-passage extends through the third heat exchanger; and the second sub-passage extends through the fourth heat exchanger.

9. The thermodynamic apparatus of claim 8, wherein:

a third sub-passage extends through the third heat exchanger, and the third heat exchanger is in flow series between a first inlet to the third sub-passage and a first outlet from the third sub-passage, the first inlet configured to receive heat transfer medium from the inlet plenum of the compressor module, the first outlet being configured to exhaust into the outlet plenum of the compressor module;

a fourth sub-passage extends through the fourth heat exchanger, and the fourth heat exchanger is in flow series between a second inlet to the fourth sub-passage and a second outlet from the fourth sub-passage, the second inlet configured to receive heat transfer medium from the inlet plenum of the turbine module, the second outlet being configured to exhaust into the outlet plenum of the turbine module;

the first heat exchanger is provided in series along the first sub-passage between an inlet to the first sub-passage and the third heat exchanger, and the third heat exchanger is provided in flow series between the first heat exchanger and an outlet from the first sub-passage; and the second heat exchanger is provided in series along the second sub-passage between an inlet to the second sub-passage and the fourth heat exchanger, and the fourth heat exchanger is provided in flow series between the second heat exchanger and an outlet from the second sub-passage.

10. The thermodynamic apparatus of claim 5, wherein a third heat exchanger is located in the working fluid flow duct in flow series between the turbine module rotor and the turbine module outlet in the second heat transfer unit, and the third heat exchanger being configured to be operable to transfer heat received from the second heat transfer unit to the working fluid passing the third heat exchanger.

11. The thermodynamic apparatus of claim 1, further comprising:
a casing, wherein the casing extends around the compressor module, turbine module, and regenerative heat exchanger.

12. The thermodynamic apparatus of claim 1, further comprising:
a casing that extends around the first heat exchanger, the compressor module rotor, the second heat exchanger, and the turbine module rotor; and
a shaft extending through the compressor module rotor and the turbine module rotor.

13. A thermodynamic apparatus comprising:
a compressor module;
a turbine module; and
a regenerative heat exchanger;
wherein each of the compressor module, turbine module, and regenerative heat exchanger are centered on a central axis, and arranged in series along the central axis such that the regenerative heat exchanger is provided between the compressor module and the turbine module;
wherein the compressor module comprises:
a first heat exchanger and a compressor module rotor, each provided in a working fluid flow duct, the first heat exchanger provided in flow series between a compressor module inlet and the compressor module rotor, and
a heat transfer unit which defines a first portion of the working fluid flow duct, wherein the first heat exchanger is in heat transfer communication with the heat transfer unit via a main passage for a first heat transfer medium, and the first heat exchanger is configured such that it is operable to transfer heat to the heat transfer unit from working fluid passing the first heat exchanger; and
a second heat exchanger is located in the working fluid flow duct in flow series between the compressor module rotor and the compressor module outlet in the heat transfer unit, and the second heat exchanger is configured to be operable to transfer heat to the heat transfer unit from the working fluid passing the second heat exchanger.

14. The thermodynamic apparatus of claim 13, wherein:
a sub-passage comprises a first node and a second node, the first node between an inlet to the sub-passage and the first heat exchanger where the sub-passage diverges to form a first branch and a second branch, and the second node between an outlet from the sub-passage and the second heat exchanger where the first branch and second branch join;
the first branch extends through the first heat exchanger and bypasses the second heat exchanger; and
the second branch bypasses the first heat exchanger and extends though the second heat exchanger.

15. The thermodynamic apparatus of claim 13, wherein the main passage comprises an inlet plenum and an outlet plenum, and the inlet plenum and outlet plenum are in fluid flow communication via a first sub-passage defined by the heat transfer unit for the transfer of the heat transfer medium through the first heat exchanger, the first sub-passage extends through the first heat exchanger, and the first heat exchanger is in flow series between a first inlet to the first sub-passage and an outlet from the first sub-passage, the first inlet configured to receive the heat transfer medium from the inlet plenum, and the outlet being configured to exhaust into the outlet plenum, and the first sub-passage comprises:
a second sub-passage which extends from a second inlet in fluid communication with the inlet plenum through the second heat exchanger and joins the first sub-passage between an outlet of the first heat exchanger and the outlet of the first sub-passage, such that flow through the first inlet and second inlet exit through the outlet.

16. The thermodynamic apparatus of claim 13, further comprising:
a casing that extends around the first heat exchanger, the compressor module rotor, the first heat transfer unit, and the second heat exchanger; and
a shaft extending through the compressor module rotor and a turbine module rotor of the turbine module.

17. The thermodynamic apparatus of claim 13, wherein the turbine module comprises:
a third heat exchanger and a turbine module rotor, each provided in the working fluid flow duct, the third heat exchanger provided in flow series between a turbine module inlet and the turbine module rotor, and
a second heat transfer unit,
wherein the third heat exchanger is in heat transfer communication with the second heat transfer unit via another main passage for a second heat transfer medium.

18. The thermodynamic apparatus of claim 17, further comprising:
a casing that extends around the first heat exchanger, the compressor module rotor, the first heat transfer unit, the second heat exchanger, the third heat exchanger, and the second heat transfer unit; and
a shaft extending through the compressor module rotor and the turbine module rotor.

19. A thermodynamic apparatus comprising:
a casing;
a compressor module within the casing and comprising a first heat exchanger, and a first rotor;
a turbine module within the casing and comprising a second heat exchanger, and a second rotor;
a regenerative heat exchanger within the casing and arranged in series with the compressor and turbine modules along a central axis such that the regenerative heat exchanger is provided between the compressor module and the turbine module; and
a shaft rotatable about the central axis and extending through each of the compressor module, turbine module, and regenerative heat exchanger, both the first and second rotors being carried on and rotatable with the shaft;
wherein the compressor module, turbine module, and regenerative heat exchanger define a working fluid flow duct which extends, in series, through each of (a) a compressor module inlet to a compressor module outlet, (b) a first path through the regenerative heat exchanger, (c) a turbine module inlet to a turbine module outlet, and (d) a second path through the regenerative heat exchanger, which is in heat transfer communication with the first path;

wherein the compressor module includes a third heat exchanger that is provided in flow series between the first rotor and the compressor module outlet, and the third heat exchanger is configured to transfer heat to a first heat transfer unit from working fluid passing the third heat exchanger; and wherein the turbine module includes a fourth heat exchanger that is provided in flow series between the second rotor and the turbine module outlet, and the fourth heat exchanger is configured to transfer heat from a second heat transfer unit to working fluid passing the fourth heat exchanger.

20. The thermodynamic apparatus of claim 19, wherein:

the first heat exchanger is provided in flow series between the compressor module inlet and the first rotor, and the first rotor is provided in flow series between the first heat exchanger and the compressor module outlet;

the first heat exchanger is configured to transfer heat to a first heat transfer unit from working fluid passing the first heat exchanger;

the second heat exchanger is provided in flow series between the turbine module inlet and the second rotor, and the second rotor is provided in flow series between the second heat exchanger and the turbine module outlet; and the second heat exchanger is configured to transfer heat received from a second heat transfer unit to working fluid passing the second heat exchanger.

\* \* \* \* \*